(12) United States Patent
Lee et al.

(10) Patent No.: US 11,259,677 B2
(45) Date of Patent: Mar. 1, 2022

(54) CLEANER

(71) Applicant: LG ELECTRONICS INC., Seoul (KR)

(72) Inventors: Sangik Lee, Seoul (KR); Jaeheon Chung, Seoul (KR); Seaunglok Ham, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 406 days.

(21) Appl. No.: 16/351,814

(22) Filed: Mar. 13, 2019

(65) Prior Publication Data

US 2019/0282055 A1    Sep. 19, 2019

(30) Foreign Application Priority Data

Mar. 13, 2018 (KR) .......................... 10-2018-0028949

(51) Int. Cl.
*A47L 9/28* (2006.01)
*H02P 29/40* (2016.01)

(52) U.S. Cl.
CPC ........... *A47L 9/2842* (2013.01); *A47L 9/2831* (2013.01); *A47L 9/2884* (2013.01); *H02P 29/40* (2016.02)

(58) Field of Classification Search
CPC .. A47L 2201/022; A47L 9/009; A47L 9/2831; A47L 9/2842; A47L 9/2884; A47L 9/2889; H02P 29/40; Y02B 40/00
See application file for complete search history.

(56) References Cited

U.S. PATENT DOCUMENTS

| 10,874,273 | B2* | 12/2020 | Han | A47L 9/2884 |
|---|---|---|---|---|
| 2009/0315501 | A1* | 12/2009 | Li | B60L 50/52 |
| | | | | 318/568.12 |
| 2012/0293128 | A1* | 11/2012 | Kim | H02J 7/0016 |
| | | | | 320/117 |
| 2015/0280473 | A1 | 10/2015 | Zhao et al. | |
| 2015/0320285 | A1* | 11/2015 | Lee | A47L 5/362 |
| | | | | 15/300.1 |

(Continued)

FOREIGN PATENT DOCUMENTS

| CN | 102185159 A | * | 9/2011 | ............ H02J 7/0018 |
|---|---|---|---|---|
| CN | 202178595 | | 3/2012 | |

(Continued)

OTHER PUBLICATIONS

KR-100899409-B1—English Machine Translation (Year: 2009).*

(Continued)

*Primary Examiner* — Marc Carlson
(74) *Attorney, Agent, or Firm* — Ked & Associates, LLP

(57) ABSTRACT

A cleaner includes a cleaner body, a power supply including a first battery and a second battery that are accommodated in the cleaner body, and a power supply circuit configured to operate in a charge mode for receiving power from the outside to recharge the first and second batteries or in a discharge mode for supplying the power recharged in the first and second batteries to a load, a charging terminal connected to an external charging stand and configured to supply direct current (DC) power to the first and second batteries in the charge mode, and a controller configured to control an operation of the power supply in the discharge mode and the charge mode.

20 Claims, 15 Drawing Sheets

(56) References Cited

U.S. PATENT DOCUMENTS

| | | | |
|---|---|---|---|
| 2017/0027400 A1* | 2/2017 | Lee | A47L 9/2842 |
| 2017/0215663 A1* | 8/2017 | Conrad | A47L 5/30 |
| 2017/0215664 A1* | 8/2017 | Conrad | A47L 1/05 |
| 2017/0265696 A1* | 9/2017 | Conrad | A47L 9/2884 |
| 2017/0303754 A1* | 10/2017 | Conrad | A47L 5/28 |
| 2018/0000303 A1* | 1/2018 | Conrad | A47L 9/1683 |
| 2018/0166903 A1* | 6/2018 | Sato | B60L 53/20 |
| 2018/0271344 A1 | 9/2018 | Han et al. | |
| 2019/0038100 A1* | 2/2019 | Lee | A47L 5/14 |
| 2019/0133400 A1* | 5/2019 | Klintemyr | A47L 9/0494 |
| 2019/0282055 A1* | 9/2019 | Lee | A47L 9/2884 |

FOREIGN PATENT DOCUMENTS

| | | | |
|---|---|---|---|
| CN | 102987987 | 3/2013 | |
| JP | 2003-219991 | 8/2003 | |
| KR | 10-2008-0105847 | 12/2008 | |
| KR | 100899409 B1 * | 5/2009 | A47L 9/2831 |
| KR | 10-1254867 | 4/2013 | |
| KR | 10-2016-0100980 | 8/2016 | |
| KR | 10-1718233 | 3/2017 | |
| KR | 10-2017-0089529 | 8/2017 | |
| TW | 201547154 | 12/2015 | |
| WO | WO-2017052205 A1 * | 3/2017 | A47L 9/28 |

OTHER PUBLICATIONS

Taiwanese Office Action dated Nov. 14, 2019 issued in TW Application No. 10821080120.
International Search Report (English translation) dated Jul. 10, 2019 issued in International Application No. PCT/KR2019/002897.

\* cited by examiner

CLEANER

CROSS-REFERENCE TO RELATED APPLICATION

This application claims priority under 35 U.S.C. § 119 to Korean Application No. 10-2018-0028949 filed on Mar. 13, 2018, whose entire disclosure is hereby incorporated by reference.

BACKGROUND

1. Field

The present application relates to a cleaner, and more particularly to a cleaner that is capable of safely and effectively recharging and using a plurality of batteries.

2. Background

In general, a cleaner (a vacuum cleaner) may include a cleaner body, which houses a suction unit to generate a suction force and a dust container (or dust bin) to capture containments, and a cleaning nozzle (or cleaning head) connected to the cleaner body and performs cleaning of a contacted area based on the suction force. The cleaner may be broadly classified into a manual cleaner that a user manually manipulates to clean an area, or an automatic cleaner that performs cleaning while traveling autonomously within the area to be cleaned. Also, certain cleaners may be capable of selectively performing manual cleaning based on manipulation by a user or automatic cleaning with manual manipulation by a user.

In the manual cleaner, the suction unit generally includes an electric motor to generate the suction force. When the electric motor is activated to generate the suction force, a user may manually manipulate at least one of the cleaning nozzle or the cleaner body to position the cleaning nozzle at an area to be cleaned, and foreign substances, such as dust, present on this area may be suctioned into the cleaning nozzle by the suction force. The suction force may further carry and deposit the foreign substances into the dust container for collection and removal.

A representative automatic cleaner is a robot cleaner. The robot cleaner correspond to a device that suctions foreign substances such as dust or wipes foreign substances from a surface while travelling autonomously on that surface. An automatic cleaner may be configured such that foreign substances in an area to be cleaned are suctioned into the cleaning nozzle by the suction force generated in the suction unit, and the suction foreign substances are collected in the dust container while the robot cleaner is traveling automatically on the area to be cleaned.

A battery may be installed in various types of manual cleaners or automatic cleaners. For example, a cleaner having a cord reel assembly (e.g., a wire cleaner) may be connected by a power cord to an external power source (e.g., a power plug) to receive electrical power for operation, but a movement of the cleaner may be restricted to a range based on the length of the power cord. Accordingly, various manual and/or automatic cleaners may operate as a wireless cleaner having a battery that provides power for operation such that the cleaner may be used without a power cord and without being restricted by the power cord of the cord reel assembly.

For example, Korean Patent Publication No. 10-2008-0105847 (published on Dec. 4, 2008) describes a cleaner that includes a battery. This cleaner may be configured to include a body that may be connected to a cord reel assembly to recharge the battery and to receive power from the battery to operate when the cord reel assembly is disconnected from the body. Accordingly, this cleaner may perform cleaning wirelessly for a particular time period depending on a capacity of the battery and without a connection to a commercial power source. In this wireless cleaner, a usage time is generally limited due to a limit in battery capacity, and it may be difficult for the wireless cleaner to provide a high suction force due to a limit in increase in suction force. Accordingly, it may be desirable to provide a battery that is configured to supply a strong power level voltage. However, providing a larger battery to supply higher voltage may lead to higher cost and weight.

Korean Patent Publication No. 10-2016-0100980 (published on Aug. 24, 2016) describes an automatic cleaner that may include multiple batteries. This automatic cleaner may receive power from at least two battery packs that are separately arranged in a cleaner body. These battery packs may be installed simultaneously, separated from each other, and separately positioned to reduce the sizes of the battery packs while providing relatively high power levels. However, these batteries are generally connected in series, and this cleaner may use a relatively high recharging voltage due to the to the batteries being connected in series (e.g., a recharging voltage corresponds to a sum of the voltages for the individual batteries).

When a battery or a group of batteries is recharged with a relatively strong power level voltage (e.g., more than 80 V), there is a potential safety hazard associated with a contact between a charging terminal of the battery and a user (e.g., the user's finger) or an object held by the user. Thus, in accordance with current design trends and safety requirements for cleaners, there is a limit to power levels used when recharging a battery.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
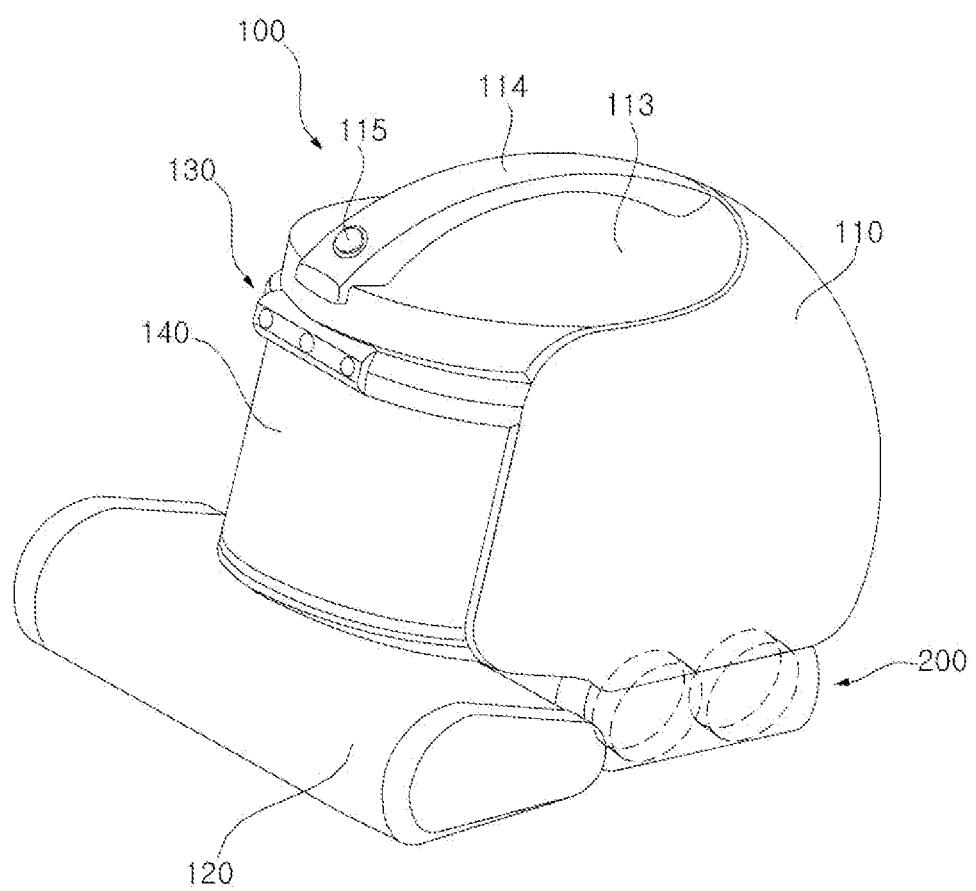
FIG. 1 is a perspective view illustrating a cleaner according to an embodiment of the present application.

Exemplary embodiments of the present application will be described with reference to the attached drawings. To clearly describe the present application, a part without concerning to the description is omitted in the drawings, and like reference numerals in the specification denote like elements.

Figure 2:
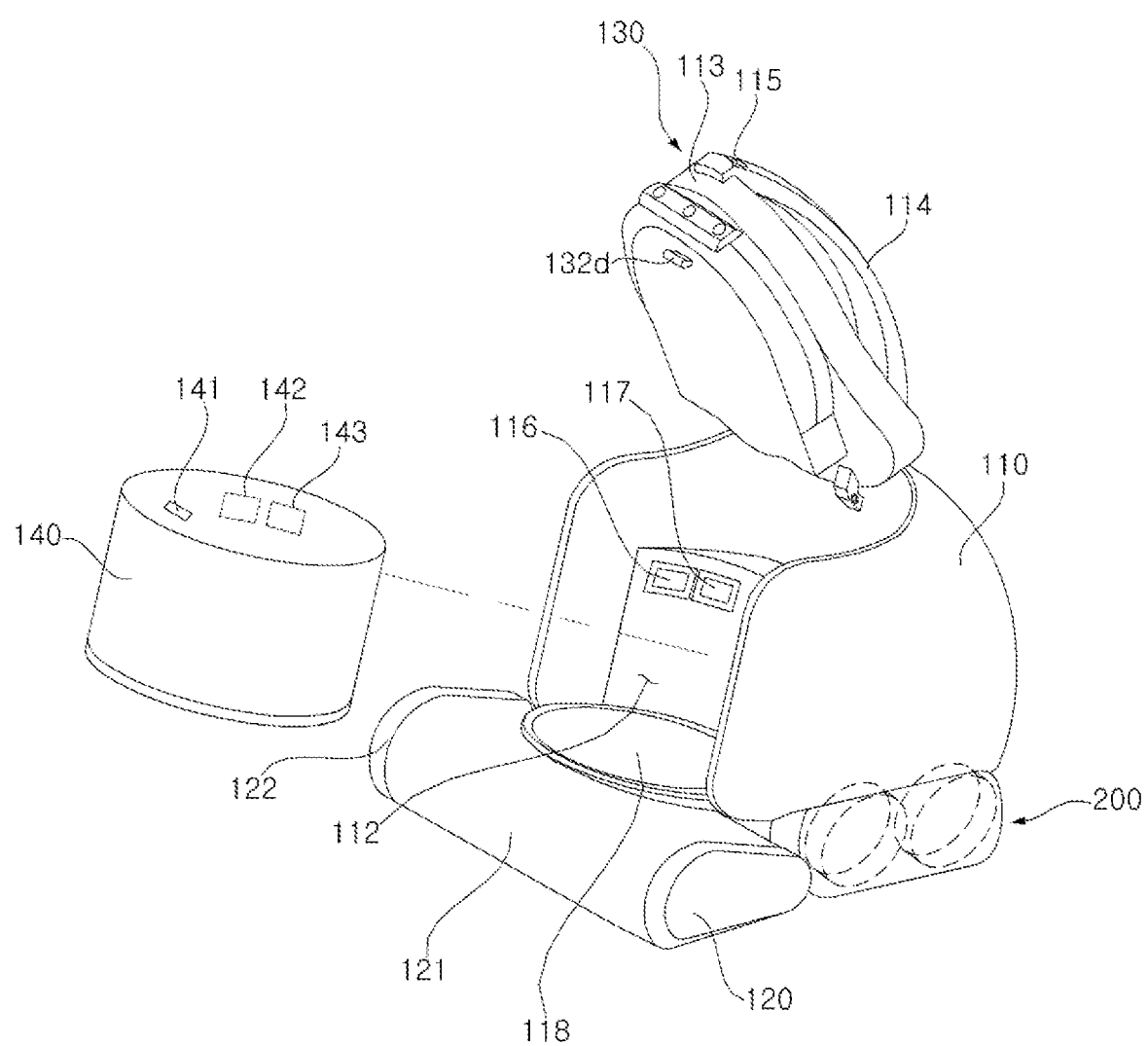
FIG. 2 is a view illustrating the cleaner from which a dust container depicted in FIG. 1 is separated.

FIG. 1 is a perspective view illustrating a cleaner according to an embodiment of the present application, and FIG. 2 is a view illustrating the cleaner from which a dust container depicted in FIG. 1 is separated. Referring to FIGS. 1 and 2, a cleaner 100 may include a cleaner body 110, a cleaning nozzle 120, a sensing unit (or sensor) 130, and a dust container 140. The cleaner body 110 further includes various components, including a controller (or processor) 150 (refer to FIG. 9) to manage components of the cleaner 100, which are embedded in or mounted on the cleaner body 110. The cleaner body 110 may have, therein, a space formed to accommodate various components that constitute the cleaner 100.

The cleaner body 110 may be configured to travel in one of an automatic mode and a manual mode depending on a user's selection. The cleaner body 110 may be provided with a mode selection input interface (e.g., a button or switch), through which a user selects one of the automatic mode or the manual mode. When the user selects the automatic mode using the mode selection input unit, the cleaner body 110 may travel autonomously like a robot cleaner. When the user selects the manual mode using the mode selection input unit, the cleaner body 110 may travel by being manually drawn or pushed by the user.

The cleaner body 110 may include a wheel unit (or driven wheel) 200 to allow the cleaner body 110 to travel. The wheel unit 200 may include a motor (not illustrated) and at least one wheel, which is configured to be rotated by the torque of the motor. The rotational direction of the motor may be controlled by the controller 150, and the wheel of the wheel unit 200 may be rotated in either a forward or reverse circumferential direction depending on the rotational direction of the motor.

The separate wheel units 200 may be provided at the left and right sides of the cleaner body 110, and the cleaner body 110 may be moved or turned in any directions by the wheel units 200. In one example, each wheel unit 200 may be configured to be operated independently. To this end, each wheel unit 200 may be individually operated by a corresponding motor. The controller 150 may manage the operation of the wheel unit 200 so that the cleaner 100 is capable of travelling autonomously on an area to be cleaned.

The wheel unit 200 200 provided at the lower side of the cleaner body 110 so as to contact a surface to drive the cleaner body 110 along that surface. The wheel unit 200 may include, for example, circular wheels, circular rollers connected via a belt chain (e.g., treads), or a combination of circular wheels and circular rollers connected via a belt chain. The one or more wheels of the wheel unit 200 may be arranged such that the upper portion thereof is located inside the cleaner body 110 and the lower portion thereof is exposed downwards from the cleaner body 110. At least the lower portion of the wheel of the wheel unit 200 may be maintained in contact with an area to be cleaned, e.g. a floor, to drive the cleaner body 110 along the floor.

The wheel unit 200 may be mounted to each of the left and right sides of the cleaner body 110. The wheel unit 200 provided at the left side of the cleaner body 110 and the wheel unit 200 provided at the right side of the cleaner body 110 may be operated independently of each other. The wheel unit 200 provided at the left side of the cleaner body 110 may be connected to a first drive motor (not shown) via at least one first gear. The first gear may be rotated by the torque of the first drive motor, and the wheel unit 200 provided at the left side of the cleaner body 110 may also be rotated along with the rotation of the first gear. The wheel unit 200 provided at the right side of the cleaner body 110 may be connected to a second drive motor (not shown) via at least one second gear. The second gear may be rotated by the torque of the second drive motor, and the wheel unit 200 provided at the right side of the cleaner body 110 may also be rotated along with the rotation of the second gear.

The controller 150 may control the rotational speed of a rotary shaft of each of the first drive motor and the second drive motor so as to determine the direction and speed in which the cleaner body 110 travels. For example, when the controller performs control such that the rotary shaft of the first drive motor and the rotary shaft of the second drive motor are simultaneously rotated at the same rotational speed as each other, the cleaner body 110 may travel straight. When the controller performs control such that the rotary shaft of the first drive motor and the rotary shaft of the second drive motor are simultaneously rotated at different rotational speeds from each other, the cleaner body 110 may turn to the left or right. To make the cleaner body 110 turn to the left or right, the controller 150 may operate one of the first drive motor and the second drive motor and may stop the operation of the other, or may the controller 150 operate one of the first drive motor and the second drive motor to rotate relatively faster than the other.

The cleaner 100 may further include a suspension unit (not shown), which may be mounted in the cleaner body 110. The suspension unit may include a coil spring or a compressible material. The suspension unit may serve to absorb shocks and vibrations, which are transmitted to the wheel unit 200 while the cleaner body 110 travels, using the elastic force of the coil spring.

In addition, the cleaner 100 may further include an ascending/descending unit or height adjustor (e.g., ascending/descending unit 400), which is mounted to the suspension unit to adjust the height of the cleaner body 110. The ascending/descending unit may include a gear or the mechanism contacting the suspension unit. The ascending/descending unit may be mounted to the suspension unit so as to be movable upwards or downwards, and may be coupled to the cleaner body 110. Therefore, when the ascending/descending unit moves upwards in the suspension unit, the cleaner body 110 may also move upwards along with the ascending/descending unit, and when the ascending/descending unit moves downwards in the suspension unit, the cleaner body 110 may also move downwards along with the ascending/descending unit. The cleaner body 110 is moved upwards or downwards by the ascending/descending unit, whereby the height thereof is adjusted.

When the cleaner body 110 travels on a hard floor to clean the same, the wheel of the wheel unit 200 and the bottom of the cleaning nozzle 120 may be maintained in close contact with the floor. However, when the cleaner body 110 travels on a carpet laid over the floor, the wheel of the wheel unit 200 may slip, and thus the traveling performance of the cleaner body 110 may be degraded. In addition, the cleaning nozzle 120 may draw the carpet with a certain suction force, and this suction force applied between the cleaning nozzle 120 and the carpet may degrade the traveling performance of the cleaner body 110. However, the ascending/descending unit may adjust the height of the cleaner body 110 depending on the slip rate of the wheel of the wheel unit 200, and consequently the degree of contact between the bottom of the cleaning nozzle 120 and an area to be cleaned may be adjusted. Accordingly, the ascending/descending unit may be used positioned the cleaner body to maintain the traveling performance of the cleaner body 110 regardless of the material of the area to be cleaned.

The wheel of the wheel unit 200 provided at the left side of the cleaner body 110 may be connected to the first drive motor via the first gear, and the wheel of the wheel unit 200 provided at the right side of the cleaner body 110 may be connected to the first drive motor or a second drive motor via the second gear. In this configuration, when the first drive motor and the second drive motor are stationary, the wheel of the wheel unit 200 provided at each of the left and right sides of the cleaner body 110 may be prevented from rotating due to friction from the first and second drive motors. In this state, the user may not be capable of driving the cleaner body 110 in a manual mode.

Therefore, when the cleaner body 110 is driven in the manual mode, the connection between the one or more wheels of the wheel unit 200 provided at each of the left and right sides of the cleaner body 110 and a corresponding one of the first and second drive motors should be released. To this end, the cleaner 100 may further include a clutch, which is provided inside the cleaner body 110 and which connects the wheel of the wheel unit 200 provided at each of the left and right sides of the cleaner body 110 and a corresponding one of the first and second drive motors when the cleaner body 110 is driven in the automatic mode, and releases the connection between the wheel of the wheel unit 200 provided at each of the left and right sides of the cleaner body 110 and a corresponding one of the first and second drive motors when the cleaner body 110 is driven in the manual mode.

The cleaner 100 may further include a battery (e.g., battery 510 in FIG. 8), which is mounted to the cleaner body 110 in order to supply electrical power to electrical components of the cleaner 100, such as the drive motors of the wheel unit 200, a suction motor, and controller 150. The battery may be configured to be rechargeable, and in some implementations, the battery may be detachably mounted to the cleaner body 110.

A dust container accommodation unit (or dust container accommodation opening) 112 is provided in the cleaner body 110. The dust container 140, which separates foreign substances from the sucked air and collects the foreign substances therein, may be detachably coupled to the dust container accommodation unit 112. The dust container accommodation unit 112 may be formed to have a shape that is opened forwards and upwards from the cleaner body 110 and that is indented from the front side of the cleaner body 110 toward the rear side of the cleaner body 110. Alternatively, the dust container accommodation unit 112 may be formed in a shape in which the front side of the cleaner body 110 is opened forwards, upwards and downwards. The dust container accommodation unit 112 may be formed at the other side of the cleaner body 110 (for example, the rear side of the cleaner body 110) depending on the kind of cleaner.

The dust container 140 may be detachably coupled to the dust container accommodation unit 112. In one example, a portion of the dust container 140 may be accommodated in the dust container accommodation unit 112, and the remaining portion of the dust container 140 may be formed to protrude from the cleaner body 110 in the forward direction.

The dust container 140 may include an inlet 142, through which air containing foreign substances such as dust is introduced, and an outlet 143, through which air from which dust has been separated is discharged. When the dust container 140 is mounted in the dust container accommodation unit 112, the inlet 142 and the outlet 143 formed in the dust container 140 may respectively communicate with a first opening 116 and a second opening 117 formed in an inner wall of the dust container accommodating unit 112.

An intake flow passage formed in the cleaner body 110 corresponds to a flow passage formed from the cleaning nozzle 120 to the first opening 116, and an exhaust flow passage formed in the cleaner body 110 corresponds to a flow passage formed from the second opening 117 to an exhaust port. Due to this air flow connection relationship, air containing foreign substances, which is introduced through the cleaning nozzle 120, is introduced into the dust container 140 via the intake flow passage in the cleaner body 110, and the foreign substances are separated from the sucked air while passing through at least one filtering member (for example, a cyclone, a filter, etc.) provided in the dust container 140. The foreign substances are collected in the dust container 140, and the air is discharged from the dust container 140. The filtered air is discharged to the outside through the exhaust port after passing through the exhaust flow passage in the cleaner body 110.

The cleaner body 110 may be provided with an upper cover 113, which may be configured to cover at least a portion of the dust container 140 accommodated in the dust container accommodation unit 112. The upper cover 113 may be hinged to a portion of the cleaner body 110 so as to be rotatable along the hinge. The upper cover 113 may cover the upper side of the dust container 140 by covering the opened upper side of the dust container accommodation unit 112. In addition, the upper cover 113 may be configured to be separable from the cleaner body 110. When the upper cover 113 covers the dust container 140, the dust container 140 may be prevented from being separated from the dust container accommodation unit 112.

The upper cover 113 may be provided, at the upper side thereof, with a handle 114. The handle 114 may be provided with an image-capturing unit (or image sensor or camera) 115. The image-capturing unit 115 may be arranged at an incline with respect to the bottom surface of the cleaner body 110 (e.g., at an inclined portion of the handle 114) so as to capture an image of the surroundings ahead of and above the cleaner body 110. The image-capturing unit 115 may be provided at the cleaner body 110, and may capture an image for simultaneous localization and mapping (SLAM) of the cleaner 100. The image captured by the image-capturing unit 115 may be used to generate a map of a traveling area or to detect the current position within the traveling area.

The image-capturing unit 115 may generate three-dimensional coordinate information related to the surroundings of the cleaner body 110. This image-capturing unit 115 may be a three-dimensional depth camera, which calculates the distance between the cleaner 100 and an object to be photographed. Accordingly, field data related to the three-dimensional coordinate information may be generated. Specifically, the image-capturing unit 115 may capture a two-dimensional image related to the surroundings of the cleaner body 110, and may generate a plurality of pieces of three-dimensional coordinate information that corresponds to the captured two-dimensional image.

In one embodiment, the image-capturing unit 115 may include two or more cameras for capturing two-dimensional images, thereby forming a stereo vision system, in which two or more images captured by the two or more cameras are combined and three-dimensional coordinate information corresponding thereto is generated. Specifically, the image-capturing unit 115 according to the embodiment may include a first pattern emission unit, which emits light in a first pattern in a forward-and-downward direction from the cleaner body, a second pattern emission unit, which emits light in a second pattern in a forward-and-upward direction from the cleaner body, and an image acquisition unit, which acquires an image of the surroundings ahead of the cleaner body. Accordingly, the image acquisition unit 115 may acquire an image of a region to which the light in the first pattern and the light in the second pattern are emitted.

In another embodiment, the image-capturing unit 115 may include a single camera and an infrared pattern projection unit (e.g., light source) that projects an infrared pattern. In this case, the distance between the image-capturing unit 115 and an object to be photographed may be measured by capturing the shape of the infrared pattern projected on the object to be photographed from the infrared pattern projection unit. In this example, the image-capturing unit 115 may be an infrared (IR)-type image-capturing unit.

In a further embodiment, the image-capturing unit 115 may include a single camera and a light-emitting unit to emit light. In this example, the distance between the image-capturing unit 115 and an object to be photographed may be measured by receiving a portion of a laser beam that is reflected from the object to be photographed after being emitted from the light-emitting unit and analyzing the received laser beam. This type of the image-capturing unit 115 may be a time-of-flight (TOF)-type image-capturing unit. Specifically, the image-capturing unit 115 may include a laser that is configured to emit a laser beam in at least one direction. For example, the image-capturing unit 115 may include a first laser and a second laser. The first laser may emit linear laser beams that intersect each other, and the second laser may emit a linear laser beam. In this case, the lowermost laser is used to sense an obstacle located at a relatively low position on an area to be cleaned, the uppermost laser is used to sense an obstacle located at a relatively high position, and the intermediate laser, which is provided between the lowermost laser and the uppermost laser, is used to sense an obstacle located at an intermediate position.

The sensing unit (or sensor) 130 may be provided at the lower side of the upper cover 113, and may be detachably coupled to the dust container 140. The sensing unit 130 may be provided at the cleaner body 110, and may detect information related to the surroundings of the cleaner body 110. The sensing unit 130 may detect information related to the surroundings in order to generate field data.

In one application, the sensing unit 130 senses the surroundings (including obstacles) of the cleaner 100 in order to prevent the cleaner 100 from colliding with obstacles. The sensing unit 130 may detect information related to the surroundings of the cleaner 100. The sensing unit 130 may sense the presence of a user around the cleaner 100. The sensing unit 130 may sense the presence of objects around the cleaner 100. In addition, in order to improve the sensing function of the cleaner and the traveling function of the robot cleaner, the sensing unit 130 may be configured so as to turn in the horizontal direction (i.e. panning) and in the vertical direction (i.e. tilting).

The sensing unit 130 may be provided at the front side of the cleaner body 110 and between the dust container 140 and the upper cover 113. Various sensors included in the sensing unit 13 may be arranged at appropriate positions depending on the type and characteristic thereof. In one example, the sensing unit 130 may be provided at the front side of the cleaner body 110 and between the dust container 140 and the upper cover 113.

The sensing unit 130 may include a coupling protrusion 132d, which protrudes from the bottom surface of the sensing unit 130, and the dust container 140 may include a coupling recess 141, which is formed in the top surface of the dust container 140 and into which the coupling protrusion 132d of the sensing unit 130 is inserted and coupled. When the upper cover 113 covers the top of the dust container accommodation unit 112, the coupling protrusion 132d of the sensing unit 130 is inserted into the coupling recess 141 in the dust container 140. In this way, the dust container 140 may be coupled to the sensing unit 130, with the result that the dust container 140 is prevented from being separated from the cleaner body 110. Conversely, when the upper cover 113 opens the top of the dust container accommodation unit 112, the coupling protrusion 132d of the sensing unit 130 escapes from the coupling recess 141 in the dust container 140. Accordingly, the coupling between the dust container 140 and the sensing unit 130 is released, and thus the dust container 140 becomes separable from the cleaner body 110.

The sensing unit 130 may include, for example, at least one of an external signal sensor, an obstacle sensor, a cliff sensor, a lower camera sensor, an upper camera sensor, an encoder, a shock sensor, or a microphone. The external signal sensor may sense an external signal of the cleaner 100. The external signal sensor may be, for example, an infrared ray sensor, an ultrasonic sensor, a radio frequency (RF) sensor, or the like. Accordingly, field data related to an external signal may be generated.

The cleaner 100 may receive a guide signal generated from the charging stand using the external signal sensor, and may detect information related to the location thereof and the direction to the charging stand. In this case, the charging stand may transmit a guide signal for indicating the direction and distance, based on which the cleaner 100 is capable of returning to the charging stand. That is, the cleaner 100 determines the current location thereof and the direction to the charging stand by receiving a signal transmitted from the charging stand, and returns to the charging stand.

The obstacle sensor of sensor unit 130 may sense an obstacle present ahead of the cleaner. Accordingly, field data related to an obstacle may be generated. The obstacle sensor may transmit field data, which is generated by sensing an object present in a region toward which the cleaner 100 is directed, to the controller. That is, the obstacle sensor may sense a protrusion, domestic items, furniture, a wall surface, a wall corner, etc. that are present in a path through which the cleaner 100 moves, and may transmit related field data to the controller. The obstacle sensor may be, for example, an infrared ray sensor, an ultrasonic sensor, an RF sensor, a geomagnetic sensor, or the like. The cleaner 100 may use one type of sensor as the obstacle sensor, or may use two or more types of sensors in combination as the obstacle sensor as needed.

The cliff sensor may primarily use various types of optical sensors, and may sense an obstacle, which is present in an area to be cleaned on which the cleaner body 110 is supported. Accordingly, field data related to an obstacle present in an area to be cleaned may be generated. The cliff sensor may be, for example, an infrared ray sensor including a light-emitting unit and a light-receiving unit, an ultrasonic sensor, an RF sensor, a position-sensitive detector (PSD) sensor, or the like, like the obstacle sensor.

For example, the cliff sensor may be a PSD sensor. However, the cliff sensor may be configured as different types of sensors. The PSD sensor may include a light-emitting unit, which emits an infrared ray toward an obstacle, and a light-receiving unit, which receives an infrared ray that is reflected and returns from the obstacle, and may be typically configured in a modular form. In the case in which an obstacle is sensed by a PSD sensor, it is possible to obtain a stable measurement value irrespective of a difference in the reflectance or in the color of an obstacle.

The controller (e.g., controller 150) may measures an angle of an infrared ray between a light emission signal generated when the cliff sensor emits an infrared ray toward the surface of an area to be cleaned and a reflection signal generated when the cliff sensor receives an infrared ray reflected from an obstacle, thereby sensing the presence of a cliff and obtaining field data related to the depth of the cliff.

The lower camera sensor may obtain image information (field data) about the surface of an area to be cleaned while the cleaner 100 is moving. The lower camera sensor is alternatively referred to using the term "optical flow sensor". The lower camera sensor may convert a lower-side image, which is received from an image sensor provided inside the sensor, and may generate predetermined type of image data (field data). As such, field data related to the image recognized through the lower camera sensor may be generated. The controller 150 may detect a location of the cleaner using the lower camera sensor regardless of slippage of the cleaner. The controller 150 may compare and analyze image data captured by the lower camera sensor over time, may calculate a moving distance and a moving direction thereof, and consequently may calculate a location of the cleaner.

The cliff sensor may also sense the material of an area to be cleaned. The cliff sensor may sense the amount of light reflected (reflectance) from the area to be cleaned, and the controller may determine the material of the area to be cleaned based on the sensed reflectance. For example, in the case in which the material of the area to be cleaned is stone, e.g. marble, which has high reflectance, the cliff sensor may sense a relatively large amount of reflected light (high reflectance), and in the case in which the material of the area to be cleaned is wood, oilpaper, or textile (e.g. carpet), which has lower reflectance than marble, the cliff sensor may sense a relatively small amount of reflected light (low reflectance). As such, the controller may determine the material of the area to be cleaned using the reflectance of the area to be cleaned that is sensed by the cliff sensor. If the reflectance of the area to be cleaned is a predetermined value, the controller may determine that the area to be cleaned is a carpet.

In addition, the cliff sensor may sense the distance to the area to be cleaned, and the controller may determine the material of the area to be cleaned based on the sensed distance to the area to be cleaned. For example, when the cleaner is located on a carpet laid over a floor, the distance to the area to be cleaned, i.e. the carpet, which is sensed by the cliff sensor, may be shorter than when the cleaner is located on a floor on which no carpet is laid. As such, the controller may determine the material of the area to be cleaned using the distance to the area to be cleaned that is sensed by the cliff sensor. If the distance to the area to be cleaned is a predetermined value or less, the controller may determine that the area to be cleaned is a carpet.

Various sensors, e.g. a camera sensor, a current sensor, etc., other than the cliff sensor, may be used as the sensor for sensing the state of the area to be cleaned. For example, the camera sensor may capture an image of the area to be cleaned, and the controller may determine the material of the area to be cleaned by analyzing the image captured by the camera sensor. Images of various materials may be stored in the controller in advance, and when the image captured by the camera sensor corresponds to one of the images stored in the controller, the controller may determine the material of the area to be cleaned to be a material in the corresponding image. If the image captured by the camera sensor coincides with an image of a carpet stored in the controller, the controller may determine that the area to be cleaned is a carpet.

The current sensor may sense a current resistance value of the wheel drive motor, and the controller may determine the material of the area to be cleaned based on the current resistance value sensed by the current sensor. For example, when the cleaning nozzle 120 is located on a carpet laid over a floor, fibers of the carpet may be drawn into the suction port by the suction force of the cleaning nozzle 120, and this suction force applied between the carpet and the suction port may prevent the cleaner from traveling smoothly. At this time, current resistance may be generated due to a load between a rotor and a stator of the wheel drive motor. The current sensor may sense the current resistance value that is generated in the wheel drive motor, and the controller may determine the material of the area to be cleaned based on the current resistance value. If the current resistance value is a predetermined value or more, the controller may determine that the area to be cleaned is a carpet.

An upper camera sensor may be mounted so as to be oriented in an upward direction or a forward direction from the cleaner 100, and may capture an image of the surroundings of the cleaner 100. In the case in which the cleaner 100 is provided with a plurality of upper camera sensors, the camera sensors may be arranged on the top surface or the side surface of the cleaner at regular intervals or angles. Field data related to the image recognized through the upper camera sensor may be generated.

The encoder may detect information related to the operation of the motor for operating the wheel of the wheel unit 200. Accordingly, field data related to the operation of the motor may be generated. The shock sensor may sense shocks generated when the cleaner 100 collides with an external obstacle or the like. Accordingly, field data related to the external shocks may be generated. The microphone may sense an external sound. Accordingly, field data related to the external sound may be generated.

In one embodiment, the sensing unit 130 may include an image sensor. In one embodiment, the field data is image information acquired by the image sensor or feature point information extracted from the image information. However, the present application is not limited thereto.

An adapter 118 may be provided at the opened lower side of the dust container accommodation unit 112. The adapter 118 may be coupled to the cleaner body 110 so as to constitute a part of the cleaner body 110. For example, when the adapter 118 is coupled to the cleaner body 110, the adapter 118 may be considered to be a part of the cleaner body 110. The dust container 140, in which foreign substances are stored, may be seated on the adapter 118. The adapter 118 may serve to interconnect the cleaner body 110 and the cleaning nozzle 120. The adapter 118 may interconnect an intake flow passage in the cleaner body 110 and an intake flow passage in the cleaning nozzle 120.

The cleaning nozzle 120 may be configured to suck air containing foreign substances such as dust or to wipe the area to be cleaned. The cleaning nozzle 120 for sucking air containing foreign substances may be referred to as a suction module, and the cleaning nozzle 120 for wiping the area to be cleaned may be referred to as a mop module. The cleaning nozzle 120 may be detachably coupled to the cleaner body 110. If the suction module is separated from the cleaner body 110, the mop module may be detachably coupled to the cleaner body 110 instead of the separated suction module. Therefore, when the user wants to remove foreign substances such as dust from the area to be cleaned, the user may install the suction module to the cleaner body 110, and when the user wants to wipe the area to be cleaned, the user may install the mop module to the cleaner body 110. The cleaning nozzle 120 may be configured to perform both the function of sucking air containing foreign substances such as dust and the function of wiping the area to be cleaned after the suction.

The cleaning nozzle 120 may be provided at the lower side of the cleaner body 110. Alternatively, as illustrated in FIGS. 1 and 2, the cleaning nozzle 120 may be provided so as to protrude from a portion of the cleaner body 110. The portion of the cleaner body 110 from which the cleaning nozzle 120 protrudes may be a portion of the cleaner body 110 that is oriented in the direction in which the cleaner body 110 advances, i.e. the front side of the cleaner body 110. The cleaning nozzle 120 may be provided at a position further forward than the wheel unit 200 so that a portion thereof may protrude forward from the dust container 140.

As illustrated in FIGS. 1 and 2, the cleaning nozzle 120 may protrude in the forward direction, the leftward direction and the rightward direction from a portion of the cleaner body 110. Specifically, the front end of the cleaning nozzle 120 may be located at a position spaced apart from the portion of the cleaner body 110 in the forward direction, and the left and right sides of the cleaning nozzle 120 are respectively located at positions spaced apart from the portion of the cleaner body 110 in the leftward and rightward directions.

A suction motor may be mounted inside the cleaner body 110. An impeller (not illustrated) may be coupled to a rotary shaft of the suction motor. When the suction motor is operated and the impeller is rotated along with the rotation of the rotary shaft, the impeller may generate suction force.

An intake flow passage (not shown) may be formed inside the cleaner body 110. Foreign substances such as dust may be introduced into the cleaning nozzle 120 from the area to be cleaned by the suction force generated by the drive force of the suction motor, and the foreign substances introduced into the cleaning nozzle 120 may be introduced into the intake flow passage.

In the case in which the cleaner body 110 travels in the automatic mode, the cleaning nozzle 120 may perform cleaning on the area to be cleaned, e.g. a floor. The cleaning nozzle 120 may be provided at a portion of the front side of the cleaner body 110 that is adjacent to the floor. The cleaning nozzle 120 may have a suction port, which is formed at the bottom surface of the cleaning nozzle 120 in order to suck air thereinto. The suction port may be formed so as to be oriented toward the floor when the cleaning nozzle 120 is coupled to the cleaner body 110.

The cleaning nozzle 120 may be coupled to the cleaner body 110 via the adapter 118. The cleaning nozzle 120 may communicate with the intake flow passage in the cleaner body 110 via the adapter 118. The cleaning nozzle 120 may be provided at a position further downward than the dust container 140 provided at the front side of the cleaner body 110.

The cleaning nozzle 120 may include a case, which has a suction port formed at the bottom surface thereof. A brush unit (or roller) may be rotatably provided inside the case. The case may provide an empty space in which the brush unit is rotatably provided. The brush unit may include a rotary shaft, which extends in the lateral direction, and a brush, which protrudes from the outer circumferential surface of the rotary shaft. The rotary shaft of the brush unit may be rotatably coupled to the left side and the right side of the case.

The case of the cleaning nozzle 120 may include a center case 121 and side cases 122, which are provided at the left and right sides of the center case 121 in order to form the left surface and the right surface of the cleaning nozzle 120. The suction port may be formed at the bottom surface of the center case 121. The center case 121 may have open left and right sides, and the side cases 122 may be coupled to the open left and right sides of the center case 121 and may shield the same.

The brush unit may be provided such that the brush is exposed downwards through the suction port formed at the bottom surface of the case. Accordingly, when the suction motor is operated, the brush may be rotated by the suction force and sweeps foreign substances such as dust up from the area to be cleaned, e.g. a floor. The swept-up foreign substances are sucked into the case by the suction force. To this end, the brush may be made of a material in which frictional electricity is not generated in order to prevent foreign substances from easily adhering to the brush.

As previously described, the adapter 118 may be coupled to the front side of the cleaner body 110. The adapter 118 may interconnect the cleaner body 110 and the cleaning nozzle 120. The cleaning nozzle 120 may be detachably coupled to the adapter 118. The adapter 118 may support the lower side of the dust container 140.

The dust container 140 may be detachably coupled to the front side of the cleaner body 110, and the lower side thereof may be supported by the adapter 118. The dust container 140 may include a case, which has a hollow cylindrical shape. A filtering unit, which separates foreign substances from the air sucked through the intake flow passage in the cleaner body 110, may be provided inside the cylindrical-shaped case. The filtering unit may include a plurality of cyclones. The foreign substances, such as dust, filtered by the filtering unit, may drop into the dust container 140, and may be contained in the dust container 140. Only air may escape out of the dust container 140, may be moved toward the suction motor by the suction force of the suction motor, and may finally be discharged outside the cleaner body 110.

The dust container 140 may have an open lower surface, and the open lower surface of the dust container 140 may be shielded by a lid 145. The lid 145 may be rotatably coupled at a portion thereof to the dust container 140 in order to open or close the dust container 140. When the lid 145 is opened, the open lower surface of the dust container 140 may be exposed, and the foreign substances contained in the dust container 140 may drop through the open lower surface of the dust container 140.

A user may throw away the foreign substances contained in the dust container 140 by separating the dust container 140 from the cleaner body 110 and opening the lid 145. In the state in which the dust container 140 is coupled to the cleaner body 110, the dust container 140 is seated on the adapter 118. That is, the lid of the dust container 140 is seated on the adapter 118.

As described above, when the cleaner body 110 travels on the area to be cleaned, e.g. a floor, in the automatic mode, the cleaning nozzle 120 may perform cleaning automatically while closely contacting the floor. However, when the user wants to perform cleaning manually, the user may select the manual mode using the mode selection input unit provided at the cleaner body 110, may separate the cleaning nozzle 120 from the cleaner body 110, and may couple a manual cleaning nozzle to the cleaner body 110, thereby performing cleaning manually. The manual cleaning nozzle may include a long bellows-type hose. In this case, a portion of the hose of the manual cleaning nozzle may be connected to the cleaner body 110.

As described above, the cleaner according to the embodiment of the present application may include the suspension unit for absorbing shocks applied to the wheel unit 200 and the ascending/descending unit for adjusting the height of the cleaner body 110. In order to enable the suspension unit to continuously absorb shocks applied to the wheel unit 200 even while the ascending/descending unit adjusts the height of the cleaner body 110, the ascending/descending unit is mounted to the suspension unit so as to be movable vertically, and is coupled to the cleaner body 110. A detailed description of this configuration will now be made with reference to FIGS. 3 to 7.

Figure 3:
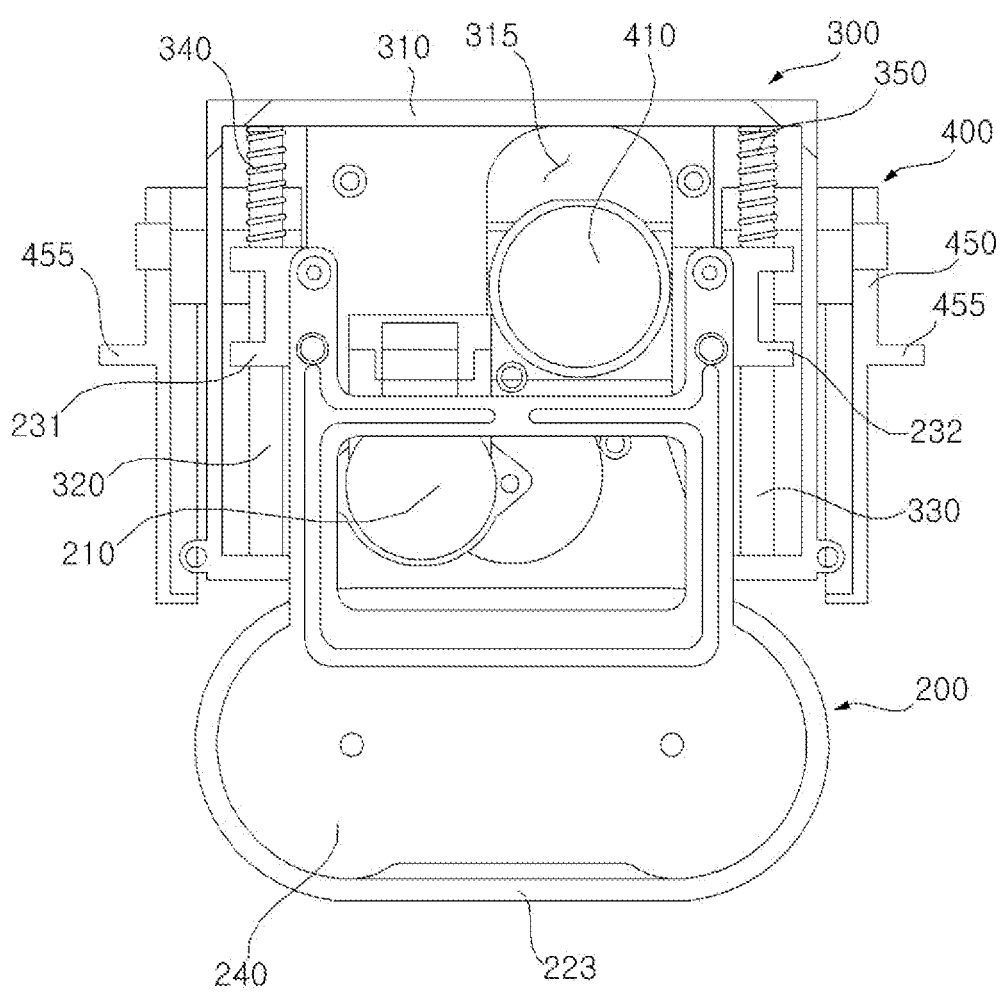
FIG. 3 is a front view illustrating the wheel unit depicted in FIGS. 1 and 2, the suspension unit coupled to the wheel unit, and the ascending/descending unit mounted to the suspension unit.
Figure 4:
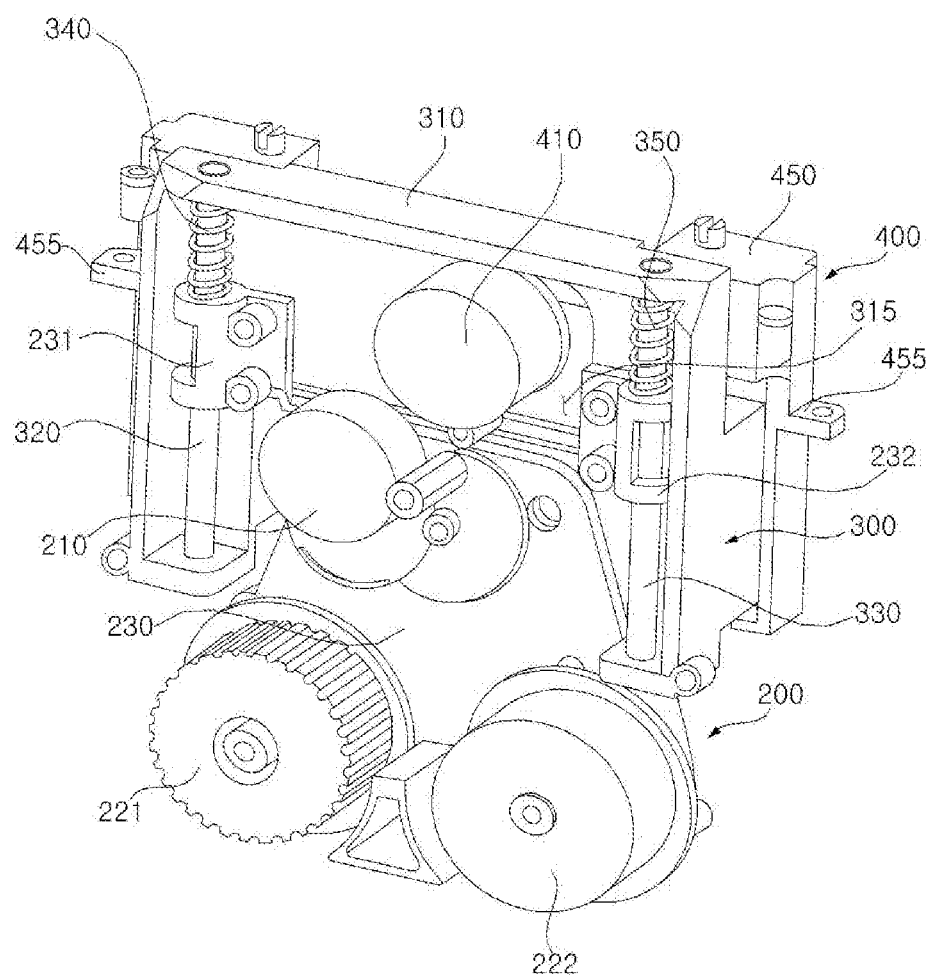
FIG. 4 is a front perspective view of FIG. 3, from which a wheel cover and a travel belt are removed.
Figure 5:
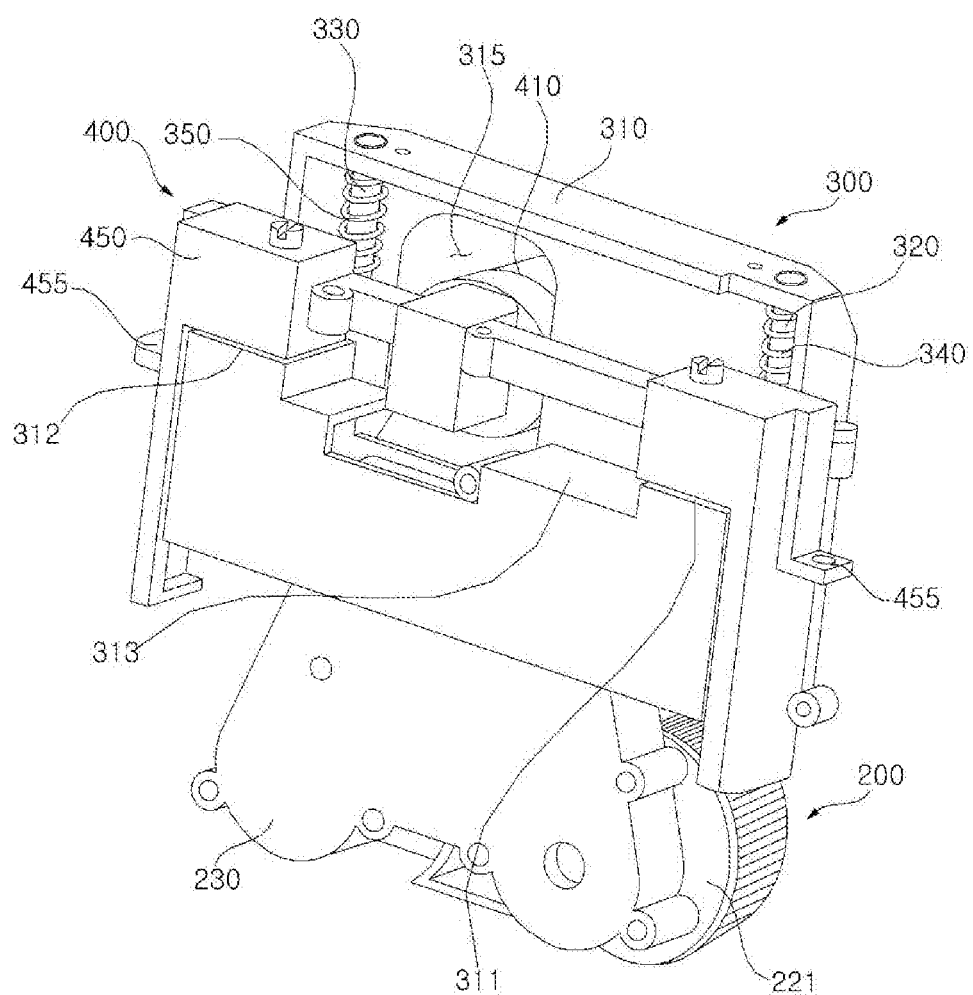
FIG. 5 is a rear perspective view of FIG. 4, which illustrates the state in which the ascending/descending unit is moved to the lowermost position.
Figure 6:
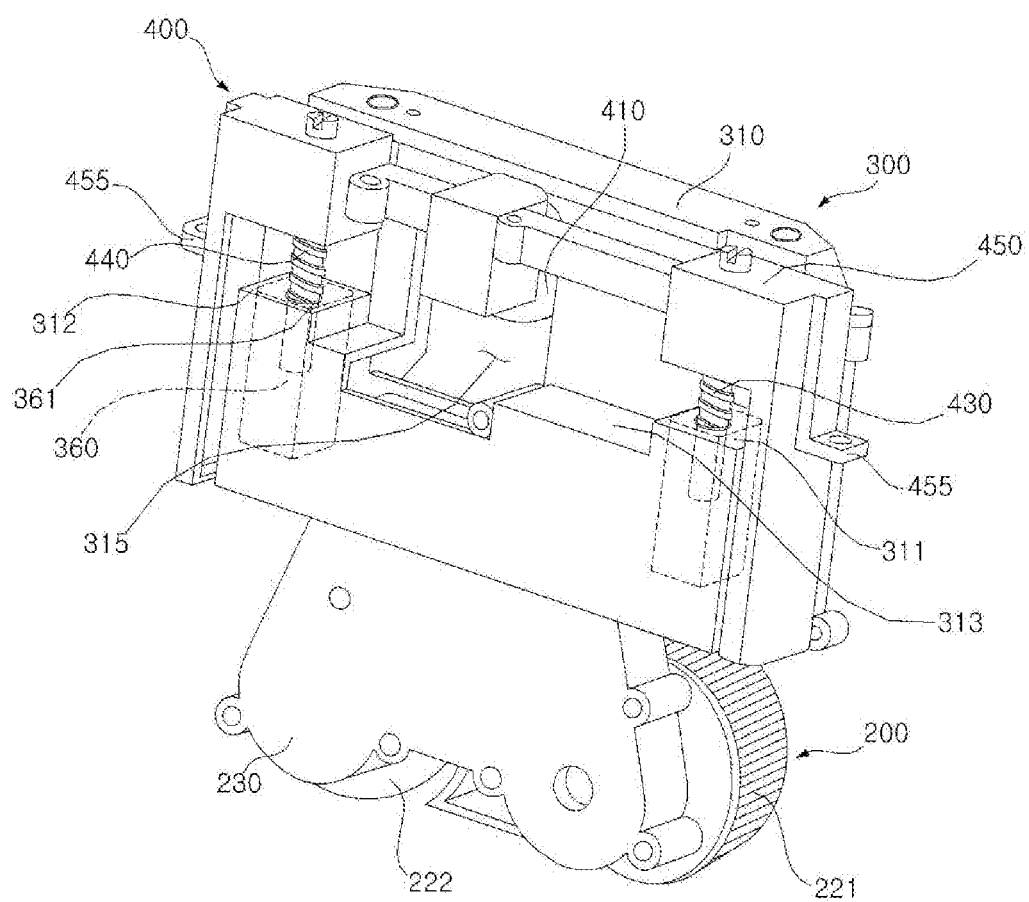
FIG. 6 is a rear perspective view of FIG. 4, which illustrates the state in which the ascending/descending unit is moved to the uppermost position.
Figure 7:
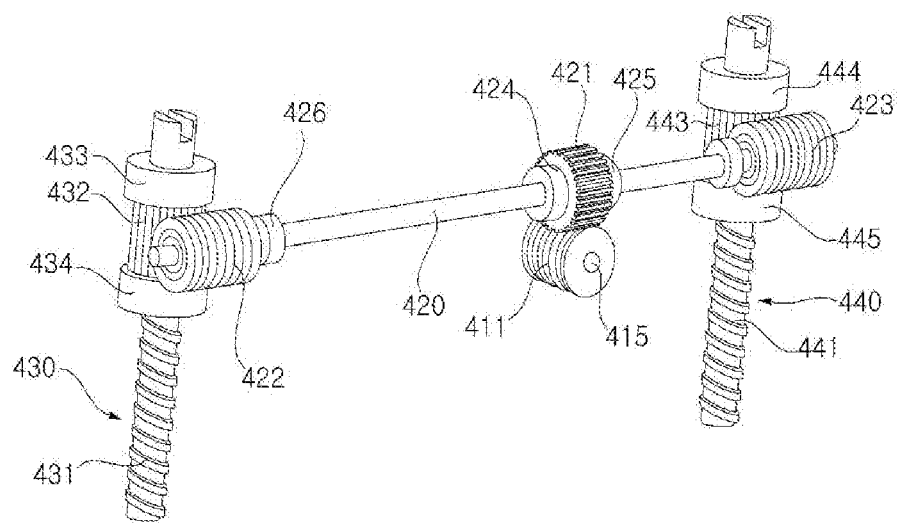
FIG. 7 is a view illustrating the configuration of an ascending/descending housing depicted in FIGS. 3 to 6.

FIG. 3 is a front view illustrating the wheel unit 200 depicted in FIGS. 1 and 2, a suspension unit 300 coupled to the wheel unit, and the ascending/descending unit mounted to the suspension unit. FIG. 4 is a front perspective view of FIG. 3, from which a wheel cover and a travel belt are removed. FIG. 5 is a rear perspective view of FIG. 4, which illustrates the state in which the ascending/descending unit is moved to the lowermost position. FIG. 6 is a rear perspective view of FIG. 4, which illustrates the state in which the ascending/descending unit is moved to the uppermost position. FIG. 7 is a view illustrating the configuration of an ascending/descending housing depicted in FIGS. 3 to 6.

Referring to FIGS. 3 to 7, the cleaner 100 according to an embodiment may include the wheel unit 200, the suspension unit 300, and the ascending/descending unit 400. The wheel unit 200 and the suspension unit 300 may be coupled to each other so as to constitute a drive unit 200 and 300. In other words, the drive unit 200 and 300 may include the wheel unit 200 and the suspension unit 300. The wheel unit 200 is provided outside the cleaner body 110. The suspension unit 300 is provided at a position further inward than the wheel unit 200. The ascending/descending unit 400 is provided at a position further inward than the suspension unit 300. That is, the wheel unit 200, the suspension unit 300 and the ascending/descending unit 400 are arranged from the outside of the cleaner body 110 in the inward direction of the cleaner body 110 in that order. The ascending/descending unit 400 may be coupled to the cleaner body 110, the suspension unit 300 may be coupled to the ascending/descending unit 400 in a suspended manner, and the wheel unit 200 may be coupled to the suspension unit 300 in a suspended manner. The wheel unit 200 may be mounted to one surface, e.g. the outer surface, of the suspension unit 300 so as to be movable vertically, and the ascending/descending unit 400 may be mounted to the opposite surface, e.g. the inner surface, of the suspension unit 300 so as to be ascendable and descendable.

The wheel unit 200 may be mounted to each of the left and right sides of the cleaner body 110 so that the cleaner body 110 can travel. The wheel unit 200 may include a travel drive motor 210, at least one wheel 221 and 222, which are configured to be rotated by the torque of the travel drive motor 210 to drive the cleaner body 110, and a gear housing 230, to which the travel drive motor 210 and the wheel 221 and 222 are mounted. The travel drive motor 210 may be fixed to the outer side of the gear housing 230. A rotary shaft of the travel drive motor 210 may be inserted from the outside of the gear housing 230 into the gear housing 230.

Wheels 221 and 222 may support the cleaner body 110 so that the cleaner body 110 is movable on the area to be cleaned. In this embodiment, the wheel 221 and 222 includes a drive wheel 221, which is provided at the front side of the gear housing 230, and a driven wheel 222, which is provided so as to be spaced apart from the drive wheel 221 in the backward direction. The drive wheel 221 and the driven wheel 222 may be connected to each other via a travel belt 223.

The drive wheel 221 may include a plurality of protrusions, which are formed on the outer circumferential surface of the drive wheel 221 and are arranged in the circumferential direction of the drive wheel 221. The travel belt 223 may include a plurality of recesses, which are formed in the inner circumferential surface of the travel belt 223 so as to allow the protrusions formed on the outer circumferential surface of the drive wheel 221 to be inserted thereinto. Due to the coupling structure in which the protrusions are inserted into the recesses, when the drive wheel 221 rotates, the travel belt 223 may be rotated without slipping, and consequently the driven wheel 222 may be rotated.

The wheel unit 200 may further include a plurality of gears (not illustrated), which are provided inside the gear housing 230 to connect the rotary shaft of the travel drive motor 210 and the drive wheel 221. In this case, the torque of the travel drive motor 210 rotates the gears provided inside the gear housing 230, and the drive wheel 221, the travel belt 223 and the driven wheel 222 are rotated sequentially.

A wheel cover 240 may be coupled to the gear housing 230 to shield the drive wheel 221, the driven wheel 222, and any gears in the wheel unit 200. The drive wheel 221 and the driven wheel 222 may be provided between the gear housing 230 and the wheel cover 240. One end of each of the drive wheel 221 and the driven wheel 222 may be rotatably coupled to the gear housing 230, and the other end of each of the drive wheel 221 and the driven wheel 222 may be rotatably coupled to the wheel cover 240.

The cleaner 100 according to a embodiment of the present application may adjust the height of the cleaner body 110. Therefore, the wheel unit 200 may be configured to allow the cleaner body 110 to travel and to be mounted to the suspension unit 300 so as to be movable vertically. That is, the wheel unit 200 may be formed in any of various configurations, as long as the wheel unit 200 includes at least one of a wheel or a belt, which is directly supported by the area to be cleaned, e.g. a floor, and is rotated, and as long as the wheel unit 200 is mounted to the suspension unit 300 so as to be movable vertically.

The suspension unit 300 may absorb shocks transmitted from the wheel unit 200 while the cleaner body 110 travels. The suspension unit 300 may include a suspension frame 310, guide bars 320 and 330, and elastic members 340 and 350. The gear housing 230 includes bar-mounting portions 231 and 232, which are mounted to the guide bars 320 and 330 of the suspension unit 300 so as to be movable vertically. Since the bar-mounting portions 231 and 232 are mounted to the guide bars 320 and 330 so as to be movable vertically, the wheel unit 200 may be mounted to the suspension unit 300 so as to be movable vertically.

The guide bars 320 and 330 may penetrate the bar-mounting portions 231 and 232 vertically. The bar-mounting portions 231 and 232 have therein through-holes that the guide bars 320 and 330 penetrate vertically. Each of the bar-mounting portions 231 and 232 is formed at a respective one of the front side and the rear side of the gear housing 230. That is, the bar-mounting portions 231 and 232 include a front bar-mounting portion 231, which is provided at the front side of the gear housing 230, and a rear bar-mounting portion 232, which is provided at the rear side of the gear housing 230. The guide bars 320 and 330 of the suspension unit 300 are two in number, namely, a front guide bar 320, which is provided at the front side of the suspension unit 300, and a rear guide bar 330, which is provided at the rear side of the suspension unit 300. The front bar-mounting portion 231 is mounted to the front guide bar 320 so as to be movable vertically, and the rear bar-mounting portion 232 is mounted to the rear guide bar 330 so as to be movable vertically.

The guide bars 320 and 330 may be mounted to the outer surface of the suspension frame 310 so as to extend vertically. The front guide bar 320 is provided at the front side of the outer surface of the suspension frame 310, and the rear guide bar 330 is provided at the rear side of the outer surface of the suspension frame 310.

The elastic members 340 and 350 may be configured as coil springs, through which the guide bars 320 and 330 pass vertically. The upper ends of the elastic members 340 and 350 are supported by the suspension frame 310, and the lower ends of the elastic members 340 and 350 are supported by the bar-mounting portions 231 and 232. If shocks are applied to the cleaner body 110 or to the wheel unit 200 while the cleaner body 110 travels, the elastic members 340 and 350 absorb the shocks by being compressed.

Since the bar-mounting portions 231 and 232 of the wheel unit 200 may be movably mounted to the guide bars 320 and 330 so as to support the lower sides of the elastic members 340 and 350, the suspension unit 300 may absorb shocks when the wheel unit 200 moves vertically. The elastic members 340 and 350 may include a front elastic member 340, through which the front guide bar 320 passes vertically and the lower end of which is supported by the front bar-mounting portion, and a rear elastic member 350, through which the rear guide bar 330 passes vertically and the lower end of which is supported by the rear bar-mounting portion.

The ascending/descending unit 400 may be coupled to the cleaner body 110. The ascending/descending unit 400 may be configured to ascend or descend together with the cleaner body 110, and may be mounted to the drive unit 200 and 300 so as to be ascendable and descendable. The ascending/descending unit 400 may be mounted to the suspension unit 300 of the drive unit 200 and 300 so as to be ascendable and descendable. The cleaner body 110 may ascend or descend along with the vertical movement of the ascending/descending unit 400, with the result that the height of the cleaner body 110 is adjusted.

The ascending/descending unit 400 may include an ascending/descending drive motor 410, a first rotary bar 420, and a second rotary bar 430 and 440. The first rotary bar 420 may be rotated by the torque of the ascending/descending drive motor 410. The second rotary bar 430 and 440 may be arranged perpendicularly to the first rotary bar 420. The first rotary bar 420 may be arranged so as to extend horizontally, specifically, in the forward-and-backward direction, and the second rotary bar 430 and 440 may be arranged so as to extend vertically. The second rotary bar 430 and 440 may be rotated by the rotational force of the first rotary bar 420, and may be mounted to the suspension unit 300 so that the cleaner body 110 ascends or descends along with the rotation of the second rotary bar 430 and 440.

The second rotary bar 430 and 440 may be provided in a plural number, and the plurality of second rotary bars 430 and 440 may be arranged parallel to each other. In this embodiment, the second rotary bars 430 and 440 are two in number, which includes a second front rotary bar 430, which is provided at the front side of the first rotary bar 420, and a second rear rotary bar 440, which is provided at the rear side of the first rotary bar 420. The second front rotary bar 430 is gear-meshed with the front end of the first rotary bar 420, and the second rear rotary bar 440 is gear-meshed with the rear end of the first rotary bar 420.

The ascending/descending unit 400 may further include an ascending/descending housing 450. The first rotary bar 420 and the second rotary bars 430 and 440 are rotatably mounted in the ascending/descending housing 450. The ascending/descending housing 450 is provided at each of the front side and the rear side thereof with a coupling portion 455, which is coupled to the cleaner body 110. The coupling portion 455 has therein a fastening hole, which penetrates the coupling portion 455 vertically. A bolt passes through the fastening hole, and is fastened to the cleaner body 110, whereby the coupling portion 455 is coupled to the cleaner body 110.

The ascending/descending housing 450 may be coupled to the cleaner body 110 so as to ascend or descend together with the second rotary bars 430 and 440. That is, when the second rotary bars 430 and 440 ascend or descend, the ascending/descending housing 450 ascends or descends together with the second rotary bars 430 and 440, thereby adjusting the height of the cleaner body 110.

The ascending/descending drive motor 410 may be coupled to the outer surface of the ascending/descending housing 450. The rotary shaft of the ascending/descending drive motor 410 may be inserted from the outside of the ascending/descending housing 450 into the ascending/descending housing 450. A first worm 411, which is coupled to the rotary shaft 415 of the ascending/descending drive motor 410, may be provided inside the ascending/descending housing 450.

The ascending/descending drive motor 410 is not coupled to the center in the forward-and-backward direction of the ascending/descending housing 450, but is provided at a position biased toward one side (the rear side) in the forward-and-backward direction. The reason for this is to prevent the ascending/descending drive motor 410 from interfering with the travel drive motor 210 when the ascending/descending unit 400 moves downwards. The travel drive motor 210 is not coupled to the center in the forward-and-backward direction of the gear housing 230, but is provided at a position biased toward the opposite side (the front side) in the forward-and-backward direction. Therefore, when the ascending/descending unit 400 moves downwards, the ascending/descending drive motor 410, which is provided at a position biased toward the one side in the forward-and-backward direction, is prevented from interfering with the travel drive motor 210. As a result, it is possible to secure space for mounting the ascending/descending unit 400 in the cleaner body 110.

The ascending/descending drive motor 410 is mounted to a portion of the outer surface of the ascending/descending housing 450 that faces the suspension frame 310. The suspension frame 310 has therein an ascending/descending hole 315, into which the ascending/descending drive motor 410 is inserted. The ascending/descending hole 315 is formed to have a sufficient vertical length so that the ascending/descending drive motor 410 ascends or descends within the ascending/descending hole 315 when the ascending/descending unit 400 ascends or descends.

The ascending/descending unit 400 may be mounted to the inner surface of the suspension frame 310, i.e. to the surface of the suspension frame 310 that faces the interior of the cleaner body 110, so as to be movable vertically. The suspension frame 310 may have stepped portions 311, 312 and 313, which are formed such that the lower portion of the inner surface of the suspension frame 310 protrudes further than the upper portion thereof. The stepped portions 311, 312 and 313 are formed from the front end of the inner surface of the suspension frame 310 to the rear end thereof, and include a front stepped portion 311, which is located at the front side, a rear stepped portion 312, which is located at the rear side, and a middle stepped portion 313, which interconnects the front stepped portion 311 and the rear stepped portion 312. The front stepped portion 311 and the rear stepped portion 312 may be formed to have the same height, which may be greater than the height of the middle stepped portion 313.

The ascending/descending hole 315 may be formed from the upper portion of the suspension frame 310 to the middle stepped portion 313. The ascending/descending unit 400 may be mounted to the front stepped portion 311 and the rear stepped portion 312 so as to be movable vertically. When the ascending/descending housing 450 of the ascending/descending unit 400 descends, it may be seated on the front stepped portion 311 and the rear stepped portion 312.

When the ascending/descending housing 450 descends and is seated on the front stepped portion 311 and the rear stepped portion 312, it surrounds both sides of the protruding lower portion of the suspension frame 310. Therefore, the ascending/descending housing 450 of the ascending/descending unit 400 may overlap the suspension frame 310. In addition, when the ascending/descending unit 400 is mounted to the suspension unit 300, the overall widths of the ascending/descending unit 400 and the suspension unit 300 are decreased, thereby securing space for disposing the ascending/descending unit 400 in the cleaner body 110.

The entire portion of the first rotary bar 420 is accommodated in the ascending/descending housing 450. However, only portions of the second rotary bars 430 and 440 are accommodated in the ascending/descending housing 450. One end portions of the second rotary bars 430 and 440 protrude from the inside of the ascending/descending housing 450 to the outside of the ascending/descending housing 450, and are mounted via insertion into the suspension unit 300. The lower end portions of the second rotary bars 430 and 440 protrude from the inside of the ascending/descending housing 450 to the lower outside of the ascending/descending housing 450, and are mounted via insertion from the top surfaces of the stepped portions 311, 312 and 313 of the suspension frame 310 into the stepped portions 311, 312 and 313. The portion of the ascending/descending housing 450, through which the second rotary bars 430 and 440 protrude to the outside of the ascending/descending housing 450, may be seated on the stepped portions 311, 312 and 313 when the ascending/descending unit 400 descends. The portion of the ascending/descending housing 450, through which the second rotary bars 430 and 440 protrude to the outside of the ascending/descending housing 450, may be seated on the front stepped portion 311 and the rear stepped portion 312 when the ascending/descending unit 400 descends.

The suspension unit 300 has therein insertion holes 361, into which the one end portions of the second rotary bars 430 and 440 are mounted via insertion. The insertion holes 361 may be formed in the stepped portions 311, 312 and 313 of the suspension frame 310. The insertion holes 361 may be formed in the front stepped portion 311 and the rear stepped portion 312 of the suspension frame 310. Insulators 360, in which the insertion holes 361 are formed, may be coupled via insertion into the stepped portions 311 and 312 of the suspension frame 310. The insertion holes 361 have threads (not illustrated) formed in the inner circumferential surfaces thereof, and the second rotary bars 430 and 440 have threads 431 and 441 formed in the outer circumferential surfaces of the one end portions thereof that protrude to the outside of the ascending/descending housing 450 so as to mesh with the threads formed in the inner circumferential surfaces of the insertion holes 361. Therefore, when the second rotary bars 430 and 440 rotate in one direction, the second rotary bars 430 and 440 protrude from the stepped portions 311 and 312, and consequently the ascending/descending unit 400 ascends.

Conversely, when the second rotary bars 430 and 440 rotate in the opposite direction, the second rotary bars 430 and 440 are inserted into the stepped portions 311 and 312, and consequently the ascending/descending unit 400 descends. The suspension frame 310 is formed of a plastic material, whereas the second rotary bars 430 and 440 are formed of stainless steel. Therefore, in order to allow the suspension frame 310 to be moved vertically without being worn by the threads 431 and 441 when the second rotary bars 430 and 440 rotate, the insulators 360 are formed of the same material as the second rotary bars 430 and 440, i.e. stainless steel.

The ascending/descending unit 400 may further include a first worm 411, a first worm wheel 421, second worms 422 and 423, and second worm wheels 432 and 443. The first worm 411 may be provided at the rotary shaft of the ascending/descending drive motor 410, and may be located inside the ascending/descending housing 450.

The first worm wheel 421 may be provided at the first rotary bar 420, and may be located inside the ascending/descending housing 450. Because the ascending/descending drive motor 410 is coupled to the ascending/descending housing 450 at a position biased toward the one side in the forward-and-backward direction, the first worm wheel 421 is not provided at the center in the longitudinal direction of the first rotary bar 420, but is provided at a position biased toward the one side in the same manner as the ascending/descending drive motor 410. The first worm wheel 421 may be tooth-engaged with the first worm 411. Since the first worm 411 and the first worm wheel 421 are tooth-engaged with each other, when the rotary shaft of the ascending/descending drive motor 410 rotates, the first rotary bar 420 may be rotated together with the rotary shaft of the ascending/descending drive motor 410.

The second worms 422 and 423 are provided at the first rotary bar 420, and are located inside the ascending/descending housing 450. When the first rotary bar 420 is rotated, the second worms 422 and 423 are rotated together with the first rotary bar 420. Because the second rotary bars 430 and 440 include two rotary bars, namely, the second front rotary bar 430 and the second rear rotary bar 440, the second worms 422 and 423 include two worms, each of which is provided at a respective one of the two end portions of the first rotary bar 420. That is, the second worms 422 and 423 include a second front worm 422, which is provided at the front end portion of the first rotary bar 420, and a second rear worm 423, which is provided at the rear end portion of the first rotary bar 420.

The second worm wheels 432 and 443 are provided at the second rotary bars 430 and 440, and are located inside the ascending/descending housing 450. Because the lower end portions of the second rotary bars 430 and 440 protrude to the lower outside of the ascending/descending housing 450 and are mounted via insertion into the insertion holes 361 in the suspension frame 310, the second worm wheels 432 and 443 are provided at the upper end portions of the second rotary bars 430 and 440. The second worm wheels 432 and 443 are tooth-engaged with the second worms 422 and 423. The second worm wheels 432 and 443 include a second front worm wheel 432, which is provided at the second front rotary bar 430, and a second rear worm wheel 443, which is provided at the second rear rotary bar 440. The second front worm wheel 432 is tooth-engaged with the second front worm 422, and the second rear worm wheel 443 is tooth-engaged with the second rear worm 423. Since the second worms 422 and 423 and the second worm wheels 432 and 443 are tooth-engaged with each other, when the first rotary bar 420 is rotated, the second rotary bars 430 and 440 are rotated together with the first rotary bar 420. That is, when the rotary shaft of the ascending/descending drive motor 410 rotates, the first rotary bar 420 and the second rotary bars 430 and 440 are rotated together with the rotary shaft of the ascending/descending drive motor 410. When the rotary shaft of the ascending/descending drive motor 410 rotates in one direction, the first rotary bar 420 and the second rotary bars 430 and 440 are rotated in the one direction. When the rotary shaft of the ascending/descending drive motor 410 rotates in the opposite direction, the first rotary bar 420 and the second rotary bars 430 and 440 are rotated in the opposite direction.

The first worm wheel 421, the second worms 422 and 423 and the first rotary bar 420 are not formed separately from each other. The first worm wheel 421 and the second worms 422 and 423 may be formed integrally with the first rotary bar 420. At this time, the first worm wheel 421, the second worms 422 and 423 and the first rotary bar 420 may be integrally formed of stainless steel. Alternatively, the first worm wheel 421 and the second worms 422 and 423 may be formed separately from the first rotary bar 420, and may be coupled to the first rotary bar 420. In other words, the first worm wheel 421 and the second worms 422 and 423 may be formed integrally with the first rotary bar 420, or may be formed separately from the first rotary bar 420. Therefore, the term "provided" was used above to describe the relationship of the first worm wheel 421 and the second worms 422 and 423 with respect to the first rotary bar 420.

The second worm wheels 432 and 443 and the second rotary bars 430 and 440 are not formed separately from each other. The second worm wheels 432 and 443 may be formed integrally with the second rotary bars 430 and 440. The threads 431 and 441, which are formed in the lower end portions of the second rotary bars 430 and 440, may also be formed integrally with the second rotary bars 430 and 440. The second front worm wheel 432, the threads 431 and the second front rotary bar 430 may be integrally formed of stainless steel. The second rear worm wheel 443, the threads 441 and the second rear rotary bar 440 may be integrally formed of stainless steel. Alternatively, the second worm wheels 432 and 443 and the threads 431 and 441 may be formed separately from the second rotary bars 430 and 440, and may be coupled to the second rotary bars 430 and 440. In other words, the second worm wheels 432 and 443 and the threads 431 and 441 may be formed integrally with the second rotary bars 430 and 440, or may be formed separately from the second rotary bars 430 and 440. Therefore, the term "provided" was used above to describe the relationship of the second worm wheels 432 and 443 with respect to the second rotary bars 430 and 440.

The ascending/descending unit 400 may further include a plurality of bearings 424, 425, 426, 427, 433, 434, 444 and 445, which allow the first rotary bar 420 and the second rotary bars 430 and 440 to be rotatably coupled to the ascending/descending housing 450. The bearings 424, 425, 426, 427, 433, 434, 444 and 445 are coupled to a heaviest portion of each of the first rotary bar 420 and the second rotary bars 430 and 440 in order to ensure smooth rotation of the first rotary bar 420 and the second rotary bars 430 and 440. Therefore, the bearings 424, 425, 426, 427, 433, 434, 444 and 445 may be coupled to portions of the first rotary bar 420 that are adjacent to the first worm wheel 421 and the second worms 422 and 423 and to portions of the second rotary bars 430 and 440 that are adjacent to the second worm wheels 432 and 443.

The bearings 424, 425, 426, 427, 433, 434, 444 and 445 include a first bearing 424, which is coupled to a portion of the first rotary bar 420 that is adjacent to the front end of the first worm wheel 421, a second bearing 425, which is coupled to a portion of the first rotary bar 420 that is adjacent to the rear end of the first worm wheel 421, a third bearing 426, which is coupled to a portion of the first rotary bar 420 that is adjacent to the rear end of the second front worm 422, a fourth bearing 427, which is coupled to a portion of the first rotary bar 420 that is adjacent to the front end of the second rear worm 423, a fifth bearing 433, which is coupled to a portion of the second front rotary bar 430 that is adjacent to the upper end of the second front worm wheel 432, a sixth bearing 434, which is coupled to a portion of the second front rotary bar 430 that is adjacent to the lower end of the second front worm wheel 432, a seventh bearing 444, which is coupled to a portion of the second rear rotary bar 440 that is adjacent to the upper end of the second rear worm wheel 443, and an eighth bearing 445, which is coupled to a portion of the second rear rotary bar 440 that is adjacent to the lower end of the second rear worm wheel 443.

Figure 8:
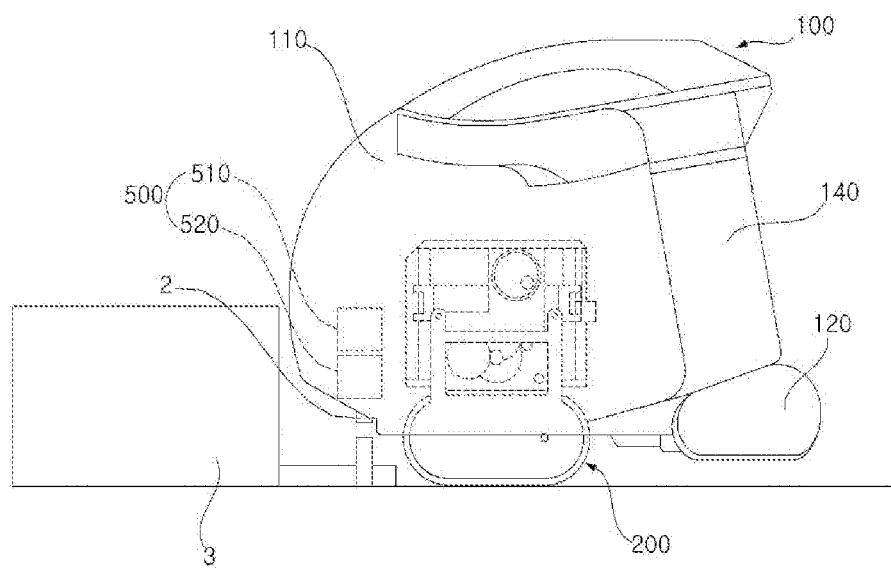
FIG. 8 is a diagram showing the state in which a cleaner is docked on a charging stand according to an embodiment of the present application.
Figure 9:
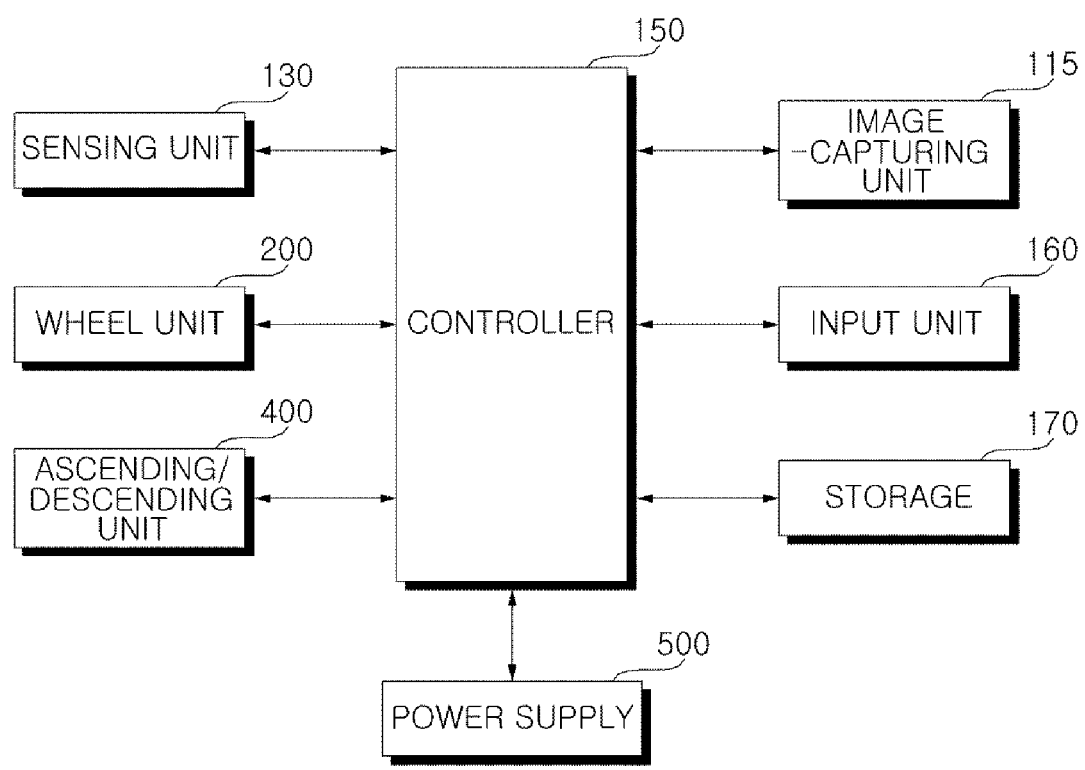
FIG. 9 is an internal block diagram of main components of a cleaner according to an embodiment of the present application.

FIG. 8 is a diagram showing the state in which a cleaner is docked on a charging stand according to an embodiment of the present application. FIG. 9 is an internal block diagram of main components of a cleaner according to an embodiment of the present application. Referring to FIGS. 8 and 9, the cleaner 100 according to an embodiment of the present application may include the cleaner body 110, the power supply 500 that supplies power for an operation of the cleaner, a charging terminal 2 connected to an external charging stand 3 to supply power to the power supply 500, and the controller 150 to control of an overall operation of the cleaner 100 (e.g., to regulate power from power supply 500 to components of the cleaner 100).

The power supply 500 may include the battery 510 and a power supply circuit 520 that operates in a charge mode for receiving power from the outside to recharge the battery 510 or in a discharge mode for supplying the power recharged in the battery 510 to a load. The battery 510 may be accommodated in the cleaner body 110. The battery 510 may store electric energy for driving various electrical components included in the cleaner body 110. The charging terminal 2 for recharging the battery 510 may be provided on a bottom surface of the cleaner body 110.

The charging terminal 2 may be preset to be connectable to the external charging stand 3 to recharge the battery. The charging terminal 2 may be connected to a supply terminal 4 provided at the charging stand 3 to receive power for recharging the battery 510. When the amount of recharge of the battery 510 is equal to or less than a predetermined value, the cleaner 100 may automatically travel to a position of the charging stand 3 and the cleaner body 110 may be docked on the charging stand 3 according to control of the controller 150. When the cleaner 100 completes cleaning, the controller 150 may control the cleaner 100 to automatically travel to the position of the charging stand 3 to dock the cleaner body 110 on the charging stand 3. The power supply circuit 520 may be provided between the battery 510 and the charging terminal 2.

The power supply 500 according to the present application may include two or more batteries 510. For example, the power supply 500 may include an even number of batteries 510. Accordingly, the even number of batteries 510 may be symmetrically arranged in the cleaner body 110. In addition, the batteries may simply embody and control a charging voltage and an output voltage in a multiple number.

According to an embodiment of the present application, the power supply 500 may include first and second batteries 511, 512. That is, the power supply 500 may include a first battery and a second battery that are accommodated in the cleaner body 110, and a power supply circuit that operates in a charge mode for receiving power from the outside to recharge the first and second batteries or in a discharge mode for supplying the power recharged in the first and second batteries to a load.

In one example, the charging terminal 2 may receive direct current (DC) power for recharging the first and second batteries from the charging stand 3 and, supply the received DC power to the power supply 500. The power supply circuit 520 may supply power to the first and second batteries in the charge mode and supply the recharged power to a load in the discharge mode.

As described above with reference to FIGS. 1 and 2, the controller 150 may control an overall operation of the cleaner 100 according to an embodiment of the present application. The controller 150 may control an operation of the power supply 500. For example, the controller 150 may control the power supply 500 to operate in the charge mode or the discharge mode. For example, the controller 150 may control a switching operation of a switching device in the power supply circuit 520 to allow the power supply 500 to operate in the charge mode or the discharge mode. The controller 150 may control a switching operation of a switching device in the power supply circuit 520 to allow the two or more batteries 510 to be connected in series or in parallel to each other. A detailed configuration and operation of the power supply 500 will be described below in reference to FIGS. 10 to 16.

The cleaner 100 according to an embodiment of the present application may further include an input unit (or user interface) 160 for inputting on/off, mode switch, or various commands and may receive a user command through the input unit 160.

The cleaner 100 according to an embodiment of the present application may further include a storage (or memory) 170 that stores various data. The storage 170 may store various pieces of information required for control of the cleaner 100 and include a volatile or non-volatile recording medium. The recording medium may store microprocessor readable data and may be, for example, a hard disk drive (HDD), a solid state disk (SSD), a silicon disk drive (SDD), ROM, RAM, CD-ROM, a magnetic tape, a floppy disk, and an optical data storage device.

As described above with reference to FIGS. 1 to 7, the cleaner 100 according to an embodiment of the present application may further include a wheel unit 200 including one or more wheels for moving the cleaner body 110. Optionally, the wheel unit 200 may include the ascending/descending unit 400 coupled to the cleaner body 110 to allow the cleaner body 110 to ascend or descend.

As described above with reference to FIGS. 1 to 7, the cleaner 100 according to an embodiment of the present application may include the image-capturing unit 115 including one or more cameras and the sensing unit 130 including one or more sensors. The sensing unit 130 may include a sensor for sensing various data related to an operation and state of the cleaner 100. For example, the sensing unit 130 may include an obstacle sensor for detecting a front obstacle. Here, the obstacle sensor may include an infrared ray sensor, an ultrasonic sensor, an RF sensor, a geomagnetic sensor, a position sensitive device (PSD) sensor, or the like.

When the cleaner 100 automatically travels, the controller 150 may control the cleaner 100 to travel and avoid the obstacle detected by the sensing unit 130. The sensing unit 130 may include at least one of an obstacle sensor, a floor sensor, or a position sensor. For example, the controller 150 may receive position information of the charging stand 3 from the sensing unit 130 to check a position of the charging stand 3.

The controller 150 may control the ascending/descending unit 400 to ascend or descend using detection data input from the sensing unit 130. The controller 150 may control the ascending/descending unit 400 to move the cleaner body 110 upward, to allow the ascending/descending unit 400 that has ascended to descend, and to move the cleaner body 110 downward to connect the charging terminal 2 to the charging stand 3 when the cleaner body 110 is docked on the charging stand 3.

In a configuration in which the charging terminal 2 is provided on the bottom surface of the cleaner body 110, when the cleaner body 110 is docking on the charging stand 3, the controller 150 may perform control such that the ascending/descending drive motor 410 is rotated in one direction and the ascending/descending unit 400 ascends, whereby the cleaner body 110 is moved upwards. After the ascending/descending unit 400 ascends, the controller 150 may perform control such that the ascending/descending drive motor 410 is rotated in the opposite direction and the ascending/descending unit 400 descends, whereby the cleaner body 110 is moved downwards and the charging terminal 2 is connected to the supply terminal 4 of the charging stand 3.

The cleaning nozzle (or cleaner head) 120 may include a suction port, which is formed at the bottom surface of the cleaning nozzle 120 in order to suck foreign substances from an area to be cleaned. For example, when the cleaner 100 travels on a carpet laid over a floor, fibers of the carpet may be drawn into the suction port by the suction force of the cleaning nozzle 120, and this suction force applied between the carpet and the suction port may degrade the traveling performance of the cleaner. Therefore, the cleaner 100 according to the embodiment of the present application may move the ascending/descending unit 400 upwards or downwards by controlling the ascending/descending drive motor 410 depending on the material of the area to be cleaned, thereby adjusting the height of the cleaning nozzle 120.

The sensing unit 130 may acquire information related to the material of the area to be cleaned, and the controller 150 may receive the information about the area to be cleaned from the sensing unit 130. The sensing unit 130 may be at least one of a distance sensor, a reflectance measuring sensor, or an image sensor, which acquires information related to the material of the area to be cleaned.

Upon determining that the area to be cleaned is a carpet based on the information about the area to be cleaned transmitted from the sensing unit 130, the controller 150 performs control such that the ascending/descending drive motor 410 is rotated in one direction and the ascending/descending unit 400 ascends, whereby the cleaning nozzle 120 is moved upwards. Upon determining that the cleaner body 110 has left the carpet based on the information about the area to be cleaned, the controller 150 performs control such that the ascending/descending drive motor 410 is rotated in the opposite direction and the ascending/descending unit 400 descends, whereby the cleaning nozzle 120 is moved downwards.

The cleaner according to an embodiment of the present application may be configured such that the ascending/descending unit 400 for moving the cleaner body 110 upwards or downwards is mounted to the suspension unit 300. Therefore, even when the height of the cleaner body 110 is adjusted by the ascending/descending unit 400, the suspension unit 300 may be capable of continuously absorbing shocks applied to the wheel unit 200

The cleaner 100 according to an embodiment of the present application may include two or more batteries 510 that are connected in series to each other during discharging and connected in parallel to each other during charging. Thus, the battery 510 may provide a strong (e.g., high) power level during discharging while being rechargeable at a relatively weak (e.g., low) power level during charging.

Figure 10:
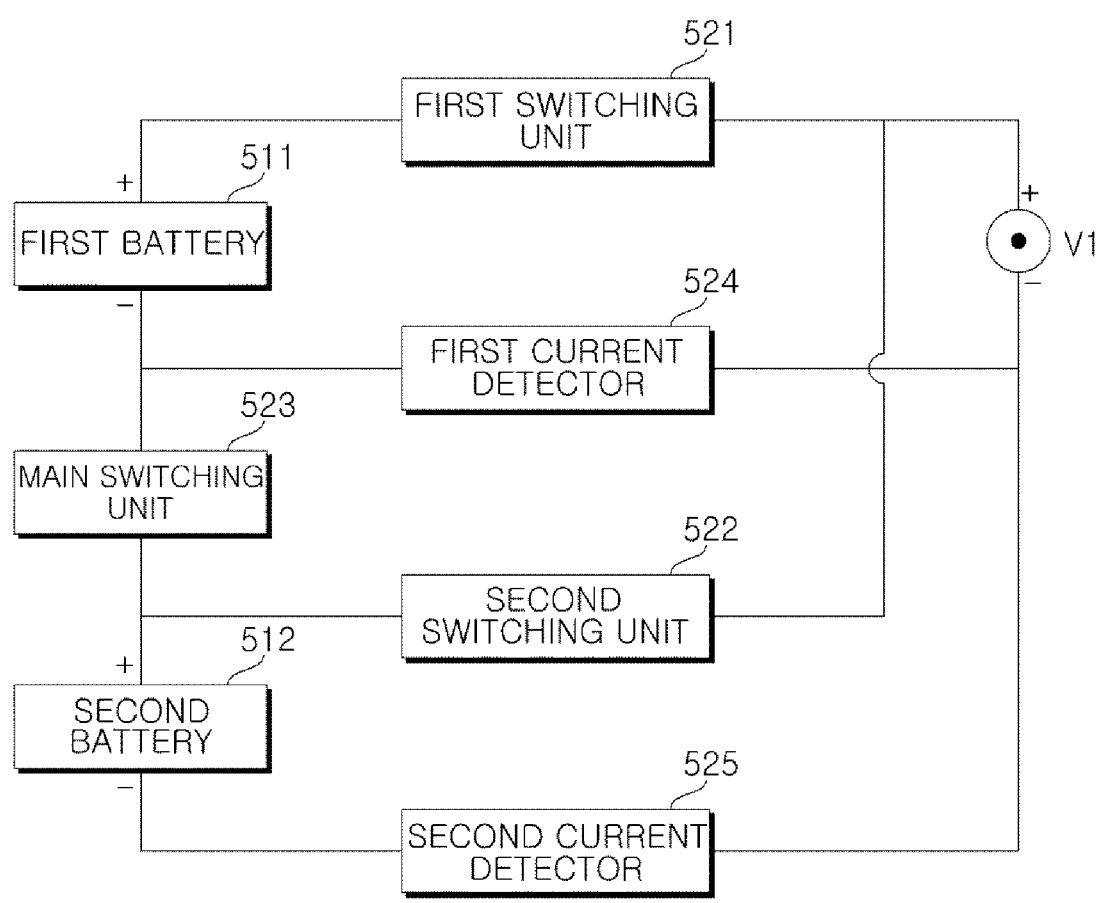
FIGS. 10 to 12 are diagrams for explanation of a configuration and operation of a power supply according to an embodiment of the present application.
Figure 11:
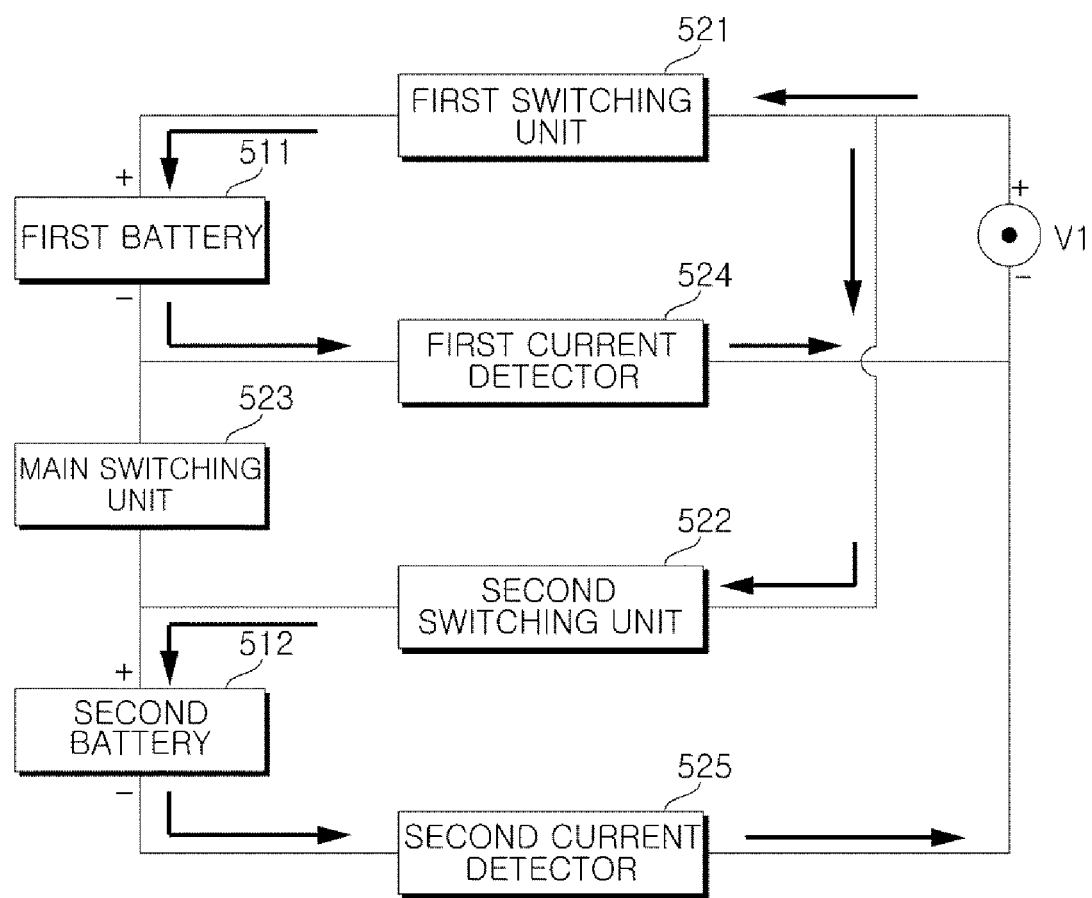
Figure 12:
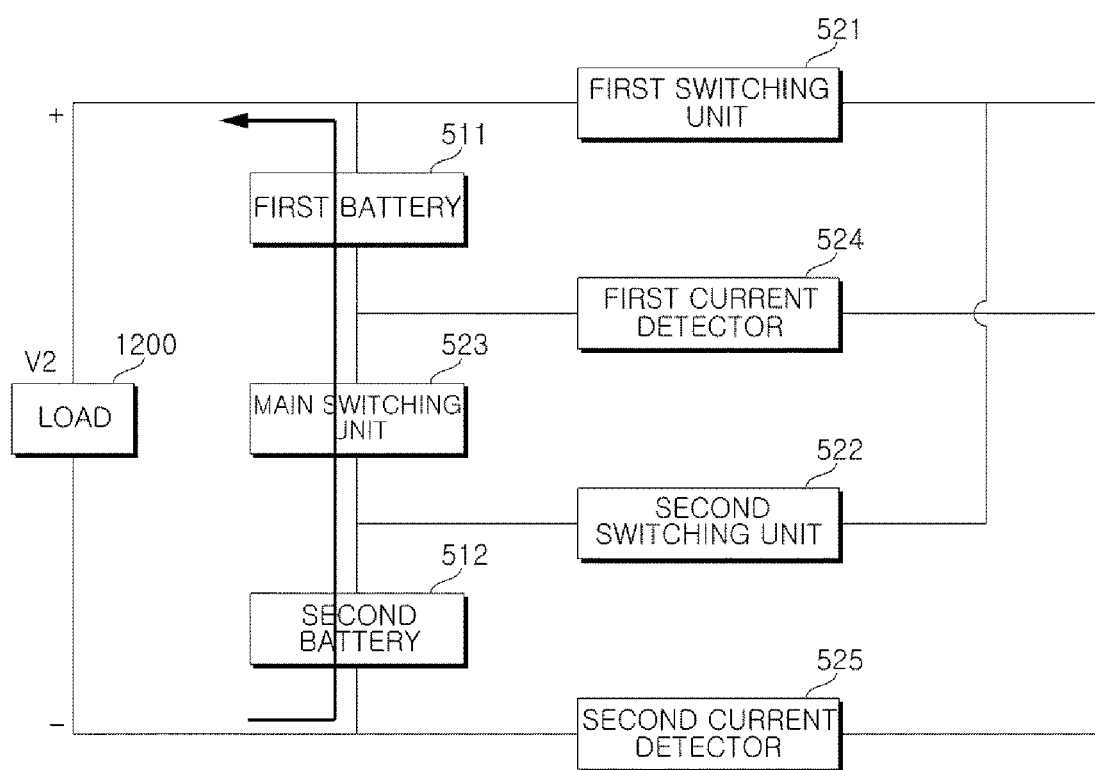

FIGS. 10 to 12 are diagrams for explanation of a configuration and operation of the power supply 500 according to an embodiment of the present application. The power supply 500 according to an embodiment of the present application may include the battery 510 and the power supply circuit 520.

Referring to FIG. 10, the power supply 500 according to an embodiment of the present application may include a first battery 511 and a second battery 512. Referring to FIG. 10, the power supply circuit 520 according to an embodiment of the present application may include the main switching unit (also referred to herein as a main switch or third switch) 523 that is switched to connect the first and second batteries 511 and 512 in series to each other in a discharge mode and to also connect the first and second batteries 511 and 512 in parallel to each in a charge mode. The power supply circuit 520 may further include a first switching unit (or first switch) 521 that is turned on to supply direct current (DC) power V1, received from the charging stand 3, to the first battery 511 in the charge mode, and a second switching unit (or second switch) 522 that is turned on to supply the DC power V1 to the second battery 512 in the charge mode.

Each of the main switching unit 523, the first switching unit 521, and the second switching unit 522 may include, for example, a switch or a switching device such as a MOSFET, a bipolar junction transistor (BJT), and an insulated gate bipolar transistor (IGBT). The main switching unit 523, the first switching unit 521, and the second switching unit 522, more particularly, some of switching devices included in the main switching unit 523, the first switching unit 521, and the second switching unit 522 may receive a control signal from the controller 150 to perform a switching operation according to control of the controller 150.

The power supply 500 may include the main switching unit 523 installed to enable switch of direct/parallel connection between the first and second batteries 511 and 512. The main switching unit 523 may have one end connected to a negative electrode (−) terminal of the first battery 511 and the other end connected to a positive electrode (+) terminal of the second battery 512. Thus, the first and second batteries 511 and 512 may be connected in series or in parallel to each other according to the switching operation of the main switching unit 523.

The power supply circuit 520 according to an embodiment of the present application may connect the first and second batteries 511 and 512 in series to each other to provide a strong power level voltage to a load such as a suction motor, a wheel motor, and an agitator motor to achieve high suction power and cleaning performance in the discharge mode in which the cleaner 100 is operated. Conversely, the power supply circuit 520 may connect the first and second batteries 511 and 512 in parallel to each other to be stably recharged in a weak power level in the charge mode in which the first and second batteries 511 and 512 are recharged. According to an embodiment of the present application, a power source of strong power output for realizing high suction force may be recharged with weak power.

Referring to FIG. 11, in the charge mode in which the first and second batteries 511 and 512 are recharged by power received from DC power V1, the negative electrode (−) terminal of the first battery 511 and the positive electrode (+) terminal of the second battery 512 may be disconnected according to switching of the main switching unit 523. Accordingly, except for the switching device, etc., a positive electrode (+) terminal of the first battery 511 and the positive electrode (+) terminal of the second battery 512 may be connected to each other and the first and second batteries 511 and 512 may be connected in parallel to each other.

In the charge mode, the first and second batteries 511 and 512 may be connected in parallel to the DC power V1 of the charging stand 3. That is, the first and second batteries 511 and 512 may be conductively disconnected and may be separately connected to the DC power V1 of the charging stand 3. As represented by the arrows in FIG. 11, the DC power V1 from the charging stand 3 may be transmitted to the first battery 511 through the first switching unit 521 and may be transmitted to the second battery 512 through the second switching unit 522.

A current path flow shown in FIG. 11 may be formed, and the first battery 511 and the second battery 512 may each be recharged with the DC power V1 from the charging stand 3. The charging stand 3 may recharge the first and second batteries 511 and 512 with the first DC power V1 in a weak power level. For example, the first DC power V1 may be 42 V that is a maximum value of a weak power level and the first and second batteries 511 and 512 may configure a battery set using a voltage corresponding to 42 V and may be recharged with 42 V. It should be appreciated that DC power V1 may be set to another value based on the batteries 511, 512. When the first and second batteries 511 and 512 are being recharged, the main switching unit 523 may be switched to recharge the first and second batteries 511 and 512 with weak power of 42 V and to switch the first and second batteries 511 and 512 to be connected in parallel to each other (e.g., such that power from the negative terminal of first battery 511 is not provided to the positive terminal of the second battery 512).

The first and second batteries 511 and 512 may include a plurality of battery cells and each battery cell may be a rechargeable/dischargeable secondary cell. For example, when the first and second batteries 511 and 512 each include ten 3.6 V battery cells that are connected in series to each other, the first and second batteries 511 and 512 may each have a voltage level of 36 V. Battery sets including ten 3.6 V battery cells may also be stably recharged with a weak power level of 42 V.

For example, a conventional battery that supports strong power level output may require an output of approximately 84 V as a strong power level in the charging stand during charging. However, during charging using a strong power level, there is safety hazard in the case of contact with fingers and chopsticks and tight restrictions are imposed on safety requirement. Accordingly, according to an embodiment of the present application, two or more weak power level batteries may be installed to be recharged with 42 V as a weak power level and may be connected in series to each other to provide a strong power level (e.g., 72 V from the sum of the 36 V provided by each of the first and second batteries 511 and 512) to drive a suction motor, an agitator motor, a wheel motor, etc. that require a high voltage. In this way, embodiment of the present application provide a strong power level battery that may be divided into a plurality of weak power level batteries and, thus, a structure in which the batteries are installed in the cleaner body 110 may be mechanically and advantageously diversified. Furthermore, a faulty portion of the battery 510 may be replaced rather than requiring replacement of the entire battery 510.

When the charging terminal 2 is connected to the charging stand 3, the main switching unit 523 may be switched to connect the first battery 511 and the second battery 512 in parallel to each other. For example, the main switching unit 523 may be mechanically pressed by a portion of the charging stand 3. Thus, when the cleaner 100 is docked on the charging stand 3 to recharge a battery to be recharged or after completing an operation, a switch of the main switching unit 523 may be mechanically pressed to connect batteries in parallel to each other and, then, the batteries connected in parallel in the cleaner 100 may begin to be recharged.

In addition or alternatively, the main switching unit 523 may be switched according to control of the controller 150 and the first battery 511 and the second battery 512 may be connected in parallel to each other. For example, the controller 150 may automatically control a switch of the main switching unit 523 for switching a series/parallel connection state of the batteries 511 and 512 according to an operating or charging situation. Accordingly, a battery may be recharged with a weak power level and restrictions related to safety requirement may be lightened.

Referring to FIG. 12, in the discharge mode in which the cleaner 100 is operated, the negative electrode (−) terminal of the first battery 511 and the positive electrode (+) terminal of the second battery 512 may be connected to each other according to switching of the main switching unit 523. Accordingly, the first and second batteries 511 and 512 may be connected in series to each other, and a strong power level voltage V2 that is the sum of DC power of the first battery 511 and DC power of the second battery 512 may be applied to a load (V2) 1200, which may correspond, for example, to a suction motor, a driving motor, an agitator motor, etc. Accordingly, the suction motor may be rotated based on the strong power level voltage V2 and generate suction force with high output, thereby enhancing cleaning performance.

For example, two 42 V batteries 511, 512 may be connected in series to each other during an operation to drive a suction motor, a driving motor, an agitator motor, etc. to provide a combined voltage of 84 V. In one implementation, when the first and second batteries 511 and 512 each include ten 3.6 V battery cells that are connected in series to each other, the first and second batteries 511 and 512 may each have a voltage level of 36 V. When the first and second batteries 511 and 512 of 36 V are connected in series to each other, a strong power level voltage of 72 V may be used.

Since the first and second batteries 511 and 512 that are connected in series to each other may be capable of outputting a high total voltage, amplitude of current required to operate a load such as a motor may be reduced and, thus, a circuit configuration required to drive the motor may be advantageously simplified. For example, the first switching unit 521 and the second switching unit 522 may each include one or more diodes for preventing inverse current, thereby preventing current from flowing in an opposite direction to a current flow set in the charge or discharge mode.

Referring to FIG. 11, a power supply circuit according to an embodiment of the present application may further include a first current detector (or current sensor) 524 to detect current flowing into the first battery 511 (e.g., from the DC power source V1) and a second current detector (or second current sensor) 525 to detect current flowing into the second battery 512 (e.g., from the DC power source V1). The first and second current detectors 524 and 525 may detect current flowing in the first and second batteries 511 and 512. To this end, the first and second current detectors 524 and 525 may include, for example, a resistance device, a current transformer (CT), and so on. Current detected by the first and second current detectors 524 and 525 may be transmitted to the controller 150 and the controller 150 may determine whether a battery is being recharged, a state of charge (SoC), and so on.

Figure 13:
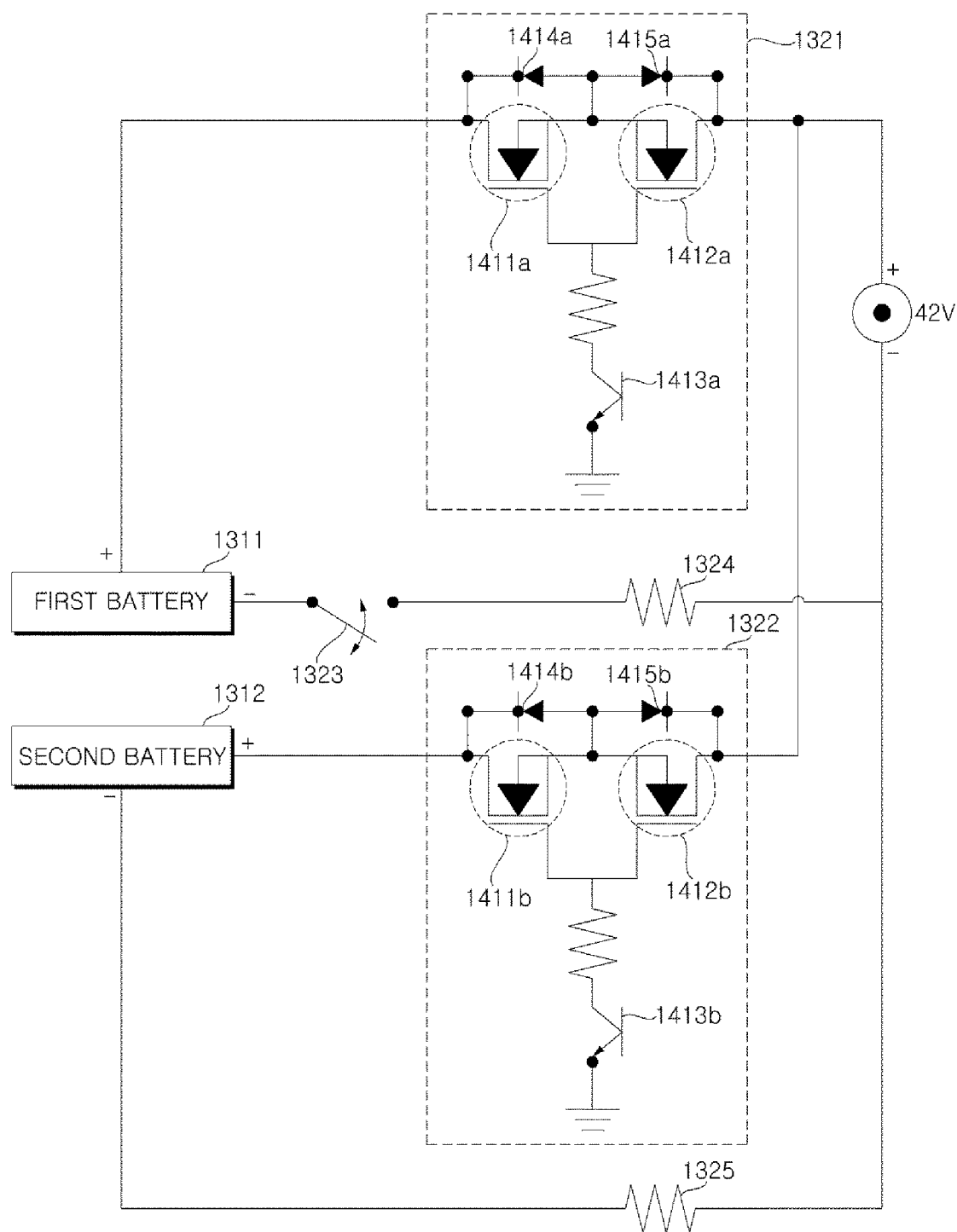
FIGS. 13 to 15 are diagrams for explanation of a configuration and operation of a power supply circuit according to an embodiment of the present application.
Figure 14:
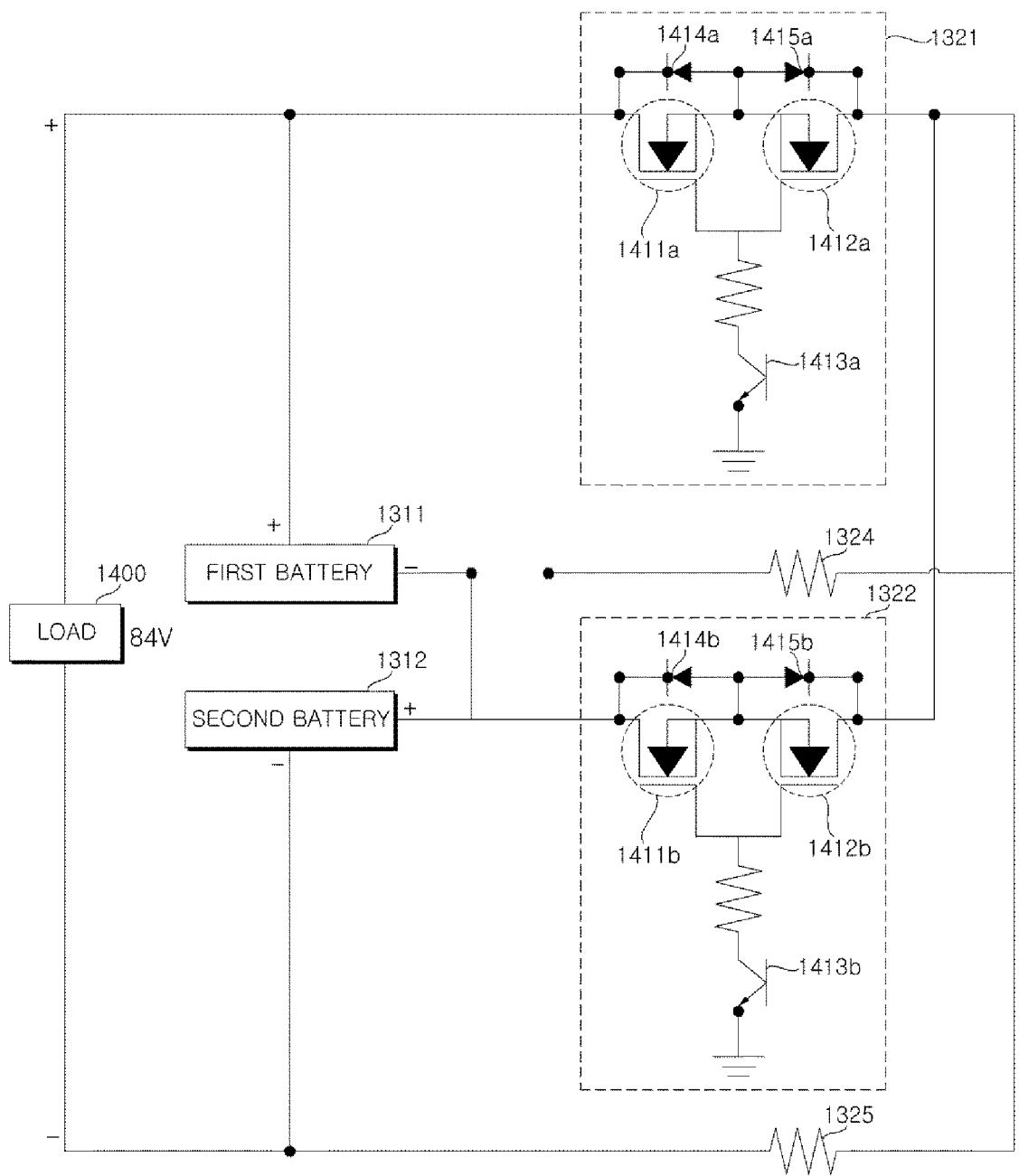
Figure 15:
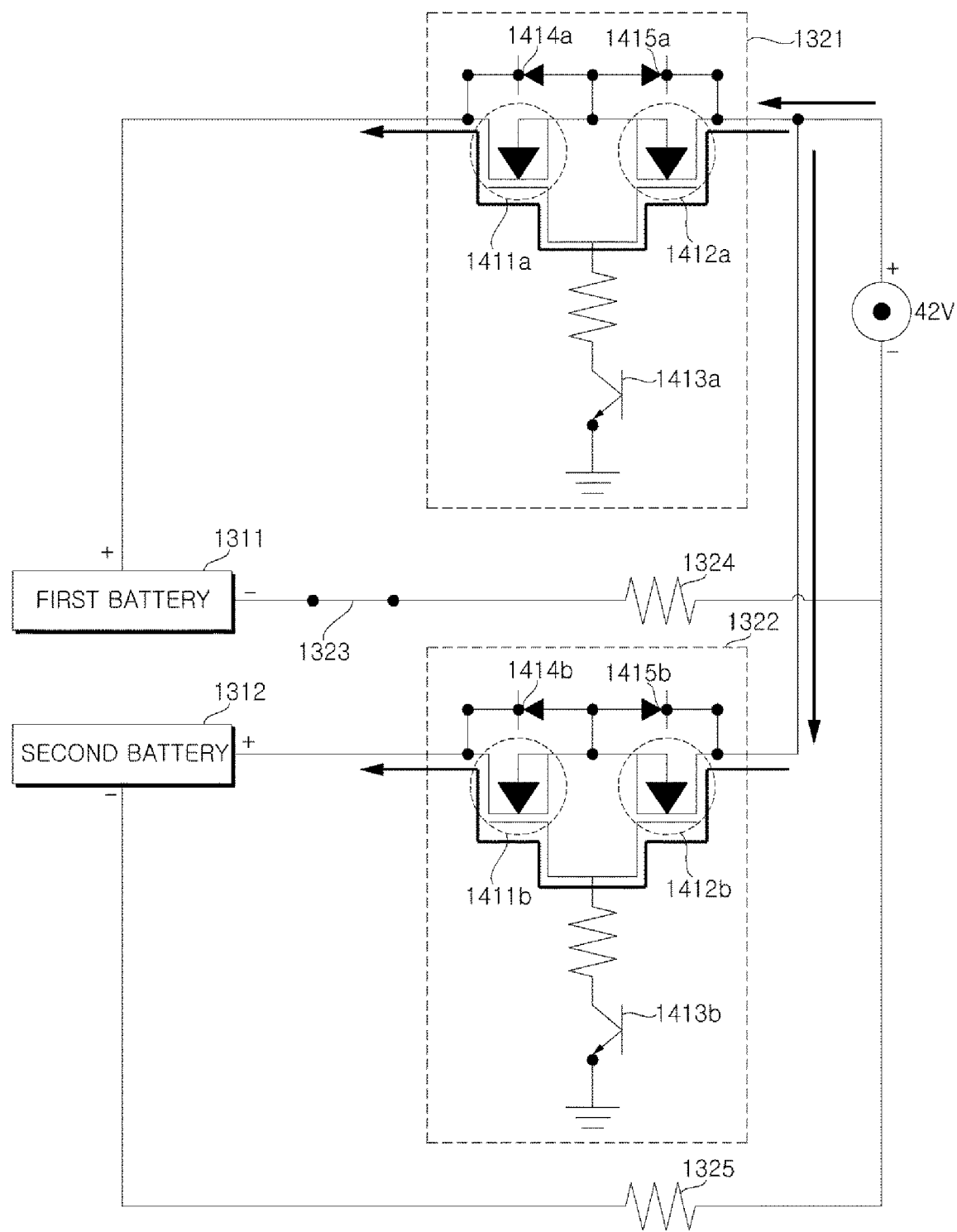

FIGS. 13 to 15 are diagrams for explanation of a configuration and operation of a power supply circuit according to an embodiment of the present application and, in particular, illustrate an example of first and second switching units. Accordingly, the power supply circuit shown in FIGS. 13 to 15 may be operated in basically the same way as the power supply circuit described with reference to FIGS. 10 to 12 and, thus, the same description is omitted or is briefly given hereinafter.

Referring to FIG. 13, the power supply 500 according to an embodiment of the present application may include a first battery 1311 and a second battery 1312. Referring to FIG. 13, the power supply circuit 520 according to an embodiment of the present application may include a main switching unit 1323 that is switched to connect the first and second batteries 1311 and 1312 in series to each other in a discharge mode and to connect the first and second batteries 1311 and 1312 in parallel to each in a charge mode, a first switching unit 1321 that is turned on to supply DC power, received from the charging stand 3, to the first battery 1311 in the charge mode, and a second switching unit 1322 that is turned on to supply DC power to the second battery 1312 in the charge mode. For example, the DC power of the charging stand 3 may be 42 V associated with a relatively weak power level.

The power supply 500 according to an embodiment of the present application may include the first battery 1311 and the second battery 1312 and include the main switching unit 1323 that allows the first and second batteries 1311 and 1312 to be connected in series or in parallel to each other. In response to a switching operation of the main switching unit 1323, a connection state of the first and second batteries 1311 and 1312 may be switched between direct and parallel connection.

Although FIGS. 13 to 15 illustrate an example in which the main switching unit 1323 is configured with one switch, switch via a switching operation is visually expressed for convenience of description and the present application is not limited thereto. For example, the main switching unit 1323 may include one or more switching devices and arrangement positions of the switching devices of the main switching unit 1323 may also be changed.

According to an embodiment of the present application, when the first and second batteries 1311 and 1312 are recharged, a connection state of the first and second batteries 1311 and 1312 may be switched to parallel connection and both the first and second batteries 1311 and 1312 may be recharged with 42 V that is the weak power level.

During automatic cleaner driving, the cleaner 100 according to an embodiment of the present application may be driven with a high voltage by connecting the first and second batteries 1311 and 1312 in series to each other. In addition, the suction motor may also be driven with a high voltage in a strong power level to increase suction force and to enhance cleaning performance.

When the cleaner 100 according to an embodiment of the present application is docked on the charging stand 3, batteries may be switched (e.g., by the main switching unit 1323) to be connected in parallel to each other and, then, may be recharged. For example, when the cleaner 100 is docked on the charging stand 3, a predetermined switch of the main switching unit 1323 may be mechanically pressed to switch batteries to be connected in parallel to each other. In addition, without use of a mechanical switch, the sensing unit 130 may detect whether the cleaner 100 is docked on the charging stand 3 and, when the cleaner 100 is docked on the charging stand 3, the controller 150 may automatically operate the main switching unit 1323. For example, the sensing unit 130 may detect when the cleaner 100 is positioned in a location associated with the charging stand 3, when a wheels 221, 222 contacts a portion of the charging stand 3 (e.g., when the wheel are vertically bumped by a portion of the charging stand 3), when terminal 2 receives power from the charging stand 3, etc.

A field effect transistor (FET) may be a type of a transistor and may have three terminals of a source, a drain, and a gate. Referring to FIGS. 13 to 15, the first switching unit 1321 may include a first N channel MOSFET 1411*a* with a drain terminal connected to the first battery 1311, a second N channel MOSFET 1412*a* with a source terminal connected to a source terminal of the first N channel MOSFET 1411*a* and a drain terminal connected to the charging terminal (DC power from the charging stand), and a bipolar junction transistor (BJT) 1413*a* connected to gate terminals of the first N channel MOSFET 1411*a* and the second N channel MOSFET 1412*a*.

The second switching unit 1322 may include a first N channel MOSFET 1411*b* with a drain terminal connected to the second battery 1312, a second N channel MOSFET 1412*b* with a source terminal connected to a source terminal of the first N channel MOSFET 1411*b* and a drain terminal connected to the charging terminal (DC power from the charging stand), and a BJT 1413*b* connected gate terminals of the first N channel MOSFET 1411*b* and the second N channel MOSFET 1412*b*.

The first switching unit 1321 and the second switching unit 1322 may further include diodes 1414*a* and 1414*b* that are arranged between a drain terminal and a source terminal of the first N channel MOSFETs 1411*a* and 1411*b*, respectively, to prevent inverse current flowing toward the charging terminal in the discharge mode. The first switching unit 1321 and the second switching unit 1322 may further include diodes 1415*a* and 1415*b* that are arranged between a drain terminal and a source terminal of the second N channel MOSFETs 1412*a* and 1412*b*, respectively, to prevent inverse current flowing through drain and source terminals of the first N channel MOSFETs 1411*a* and 1411*b* in the charge mode.

Referring to FIG. 14, when the cleaner 100 is operated or travels for cleaning, the main switching unit 1323 may be turned on and the first battery 1311 and the second battery 1312 may be connected in series to each other. Here, an on-state of the main switching unit 1323 may refer to a state in which the main switching unit 1323 is maintained to be switched in a first direction. The first N channel MOSFET 1411*a* and 1411*b* and the second N channel MOSFETs 1412*a* and 1412*b* may be turned off to form a path in which the first battery 1311 and the second battery 1312 are connected in series to each other.

In the discharge mode in which the cleaner 100 is operated, a negative electrode (−) terminal of the first battery 1311 and a positive electrode (+) terminal of the second battery 1312 may be connected according to switching of the main switching unit 1323. Accordingly, the first and second batteries 1311 and 1312 may be connected in series to each other and a strong power level voltage that is the sum of DC power of the first battery 1311 and DC power of the second battery 1312 may be applied to a load 1400 such as a suction motor, a driving motor, and an agitator motor.

When two equal batteries are connected in series to each other, a voltage may be doubled. When the first battery 1311 and the second battery 1312 are connected in series to each other, strong power level voltage of 84 V may be applied to the load 1400 such as a suction motor. Accordingly, a suction motor may generate stronger suction force and enhance cleaning performance. Also, the diodes 1414*a* and 1414*b* may help to prevent an inverse current of the first and second switching units 1321 and 1322 may prevent current from flowing toward another power supply circuit (toward a charging terminal) during discharging.

Referring to FIG. 15, when the cleaner 100 is recharged, the main switching unit 1323 may be turned off and the first battery 1311 and the second battery 1312 may be connected in parallel to each other. Here, an off-state of the main switching unit 1323 may refer to a state in which the main switching unit 1323 is maintained to be switched in a second direction. After a battery connection state is switched to a parallel connection state, the power supply 500 may receive 42 V from the charging stand to recharge the first battery 1311 and the second battery 1312.

The BJTs 1413*a* and 1413*b*, the first N channel MOSFET 1411*a* and 1411*b*, and the second N channel MOSFETs 1412*a* and 1412*b* of the first and second switching unit 1321 and 1322 may be turned on according to control of the controller 150. In some embodiments, the BJTs 1413*a* and 1413*b* may have a collector terminal connected to gate terminals of the first N channel MOSFETs 1411*a* and 1411*b* and the second N channel MOSFETs 1412*a* and 1412*b* and a base terminal connected to the controller 150 and may be turned on according to control of the controller 150.

The BJTs 1413*a* and 1413*b* of the first and second switching unit 1321 and 1322 may be turned on according to control of the controller 150. Accordingly, the gate terminals of the first N channel MOSFET 1411a and 1411b and the second N channel MOSFETs 1412a and 1412b may become in a high state to turn on the first N channel MOSFET 1411a and 1411b and the second N channel MOSFETs 1412a and 1412b.

Accordingly, a current path for recharging the first and second batteries 1311 and 1312 connected in parallel to each other may be formed with a weak power level voltage of 42 V at a charging terminal side. The power supply 500 may be configured by attaching a shunt resistor to a ground GND (not shown) to measure current intensity and to read the measured current intensity by the controller 150.

The power supply circuit according to an embodiment of the present application may include shunt resistors 1324 and 1325 that are connected to the first and second batteries, respectively and, the controller 150 may determine at least one of whether a battery is being recharged, whether a battery is completely recharged, or the remaining capacity of the battery based on current data detected by the shunt resistors 1324 and 1325.

Figure 16:
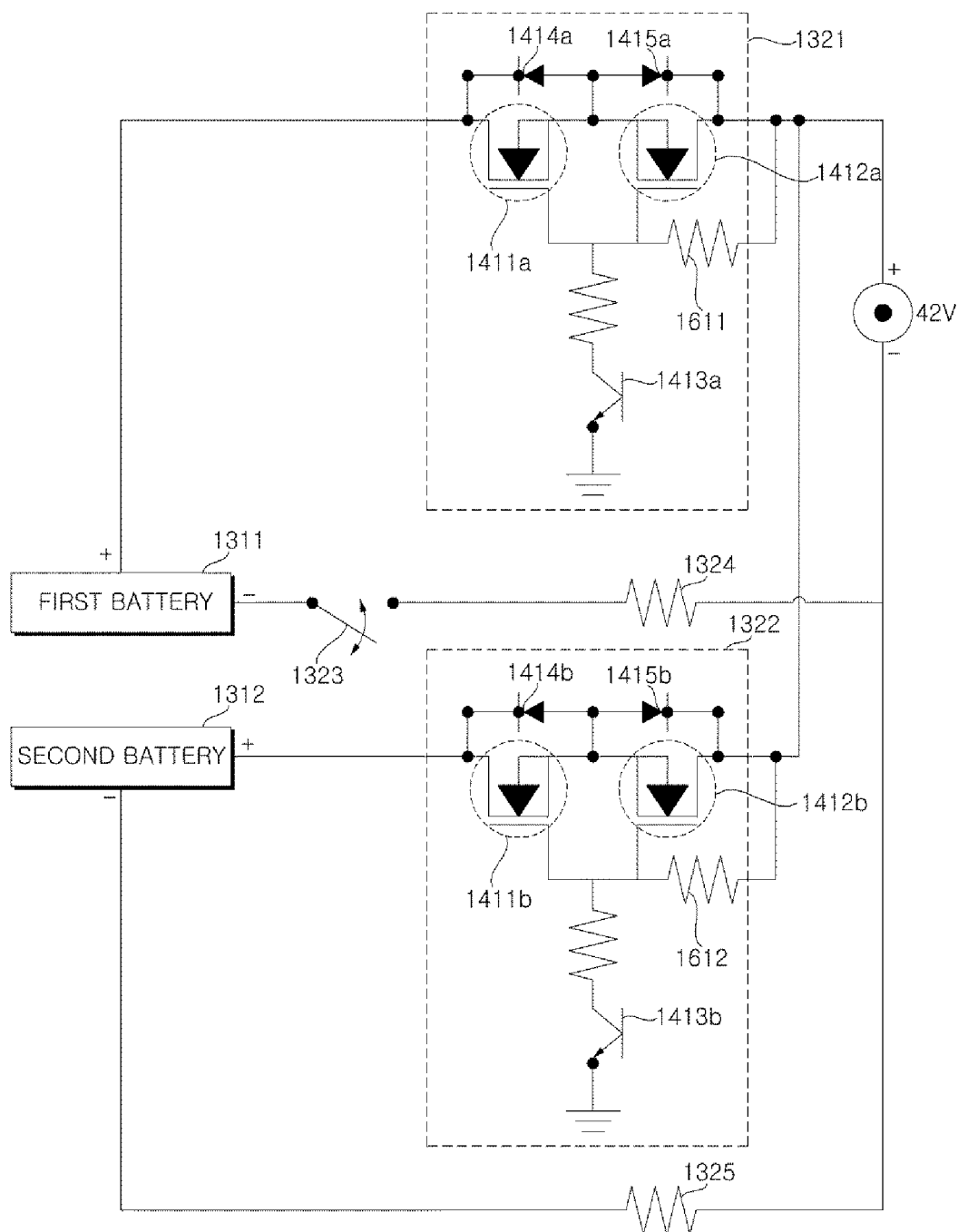
FIG. 16 is a diagram for explanation of a configuration and operation of a power supply circuit according to an embodiment of the present application.

FIG. 16 is a diagram for explanation of a configuration and operation of a power supply circuit according to an embodiment of the present application. The power supply circuit of FIG. 16 is different from the power supply circuit described with reference to FIGS. 13 to 15 in that resistor devices (or resistor) 1611 and 1612 are further included.

Referring to FIG. 16, the first switching unit 1321 and the second switching unit 1322 may further include the resistor devices 1611 and 1612 that are arranged between a gate terminal and a drain terminal of the second N channel MOSFETs 1412a and 1412b, respectively. According to an embodiment, when the cleaner 100 is docked on the charging stand 3, one end at a charging terminal side of the resistor devices 1611 and 1612 may be connected to 42 V of DC power of the charging stand 3. Accordingly, a gate of the second N channel MOSFETs 1412a and 1412b connected to the other end of the resistor devices 1611 and 1612 may be converted into a high state and the second N channel MOSFETs 1412a and 1412b may be turned on.

In some example, without control of the controller 150, in response to the cleaner 100 being docked on the charging stand 3, the second N channel MOSFETs 1412a and 1412b may be turned on. In some embodiments, the resistor devices 1611 and 1612 may also be connected to a gate terminal of the first N channel MOSFETs 1411a and 1411b and, in response to the cleaner 100 being docked on the charging stand 3, the first N channel MOSFETs 1411a and 1411b may be turned on.

According exemplary embodiments of the present application, a cleaner for stably and effectively recharging and using a plurality of batteries may be provided. According to exemplary embodiments of the present application, a battery may be stably recharged in a weak power level and a high voltage may be supplied to various loads such as a motor in a strong power level. According to exemplary embodiments of the present application, both automatic cleaning and manual cleaning may be supported, thereby enhancing user convenience. According to exemplary embodiments of the present application, a cleaner body may be allowed to ascend or descend to more stably recharge a plurality of batteries. Other various aspects may be directly or implicitly disclosed in the above detailed description of the present application.

The cleaner according to the present application are not limited to the configurations and methods of the above-described embodiments. That is, the above-described embodiments may be partially or wholly combined to make various modifications.

A method of controlling a cleaner according to an embodiment of the present application can also be embodied as processor readable code on a processor readable recording medium. The processor readable recording medium is any data storage device that can store data which can be thereafter read by a processor. Examples of the processor readable recording medium include read-only memory (ROM), random-access memory (RAM), magnetic tapes, floppy disks, optical data storage devices, carrier waves such as transmission via the Internet, etc. The processor readable recording medium can also be distributed over network coupled computer systems so that the processor readable code is stored and executed in a distributed fashion.

Embodiments of the present application provide a method of supplying power in a strong power level to a cleaner so that the cleaner may provide a high suction force. To prevent safety hazard, embodiments of the present application further provide a method of safely connecting a cleaner to a charging stand only during charging without outside exposure of a charging terminal of the cleaner.

An aspect of the present application provides a cleaner that is safely and effectively recharging and using a plurality of batteries. Another aspect of the present application provides a cleaner that is capable of safely recharging a battery in a weak power level and supplying a high voltage to various motor loads in a strong power level. A further aspect of the present application provides a cleaner that is capable of selectively performing automatic cleaning or manual cleaning to enhance convenience of use. A further aspect of the present application provides a method of more safely recharging a plurality of batteries by allowing a body to ascend or descend.

In accordance with these and other objects can be accomplished by the provision of a cleaner including two or more batteries and, in this case, the two or more batteries may be connected in series to each other while being discharged. Accordingly, the battery may be used in a strong power level while being discharged and may be rechargeable in a weak power level while being recharged.

In accordance with another aspect of the present application, there is provided a cleaner including a cleaner body, a power supply including a first battery and a second battery that are accommodated in the cleaner body, and a power supply circuit configured to operate in a charge mode for receiving power from the outside to recharge the first and second batteries or in a discharge mode for supplying the power recharged in the first and second batteries to a load, a charging terminal connected to an external charging stand and configured to supply direct current (DC) power recharged in the first and second batteries to the power supply, and a controller configured to control an operation of the power supply, wherein the power supply circuit includes a main switching unit switched to connect the first and second batteries in a series to each other in the discharge mode and to connect the first and second batteries in parallel to each other in the charge mode, a first switching unit that is turned on in the charge mode and supplies the DC power to the first battery, and a second switching unit that is turned on in the charge mode and supplies the DC power to the second battery, thereby safely and effectively recharging a plurality of batteries.

The main switching unit may be mechanically pressed to be switched or may be switched under control of the controller when the charging terminal is connected to the charging stand and may include one end connected to a negative electrode terminal of the first battery and the other end connected to a positive electrode terminal of the second battery. The first and second batteries may be connected in parallel to the DC power of the charging stand in the charge mode and the charging terminal may be provided on a bottom surface of the cleaner body.

Each of the first switching unit and the second switching unit may include one or more diodes for preventing inverse current. Each of the first switching unit and the second switching may include a first N channel MOSFET with a drain terminal connected to the first battery or the second battery, a second N channel MOSFET with a source terminal connected to a source terminal of the first N channel MOSFET and a drain terminal connected to the charging terminal, and a bipolar junction transistor (BJT) connected to gate terminals of the first N channel MOSFET and the second N channel MOSFET. In this example, the BJT may include a collector terminal connected to the gate terminals of the first N channel MOSFET and the second N channel MOSFET and a base terminal connected to the controller, and is turned on according to control of the controller.

Each of the first switching unit and the second switching unit may further include a diode provided between the drain terminal and the source terminal of the first N channel MOSFET and configured to prevent inverse current flowing toward the charging terminal in the discharge mode and may further include a diode provided between the drain terminal and the source terminal of the second N channel MOSFET and configured to prevent inverse current flowing toward the drain terminal and the source terminal of the first N channel MOSFET in the charge mode.

The power supply circuit may include a shunt resistor connected to each of the first and second batteries. Each of the first switching unit and the second switching unit may include a resistor device provided between the gate terminal and the drain terminal of the second N channel MOSFET. The power supply circuit may further include a first current detector configured to detect current flowing in the first battery and a second current detector configured to detect current flowing in the second battery.

The cleaner may further include a wheel unit including one or more wheels for moving the cleaner body, and an ascending/descending unit coupled to the cleaner body to allow the cleaner body to ascend or descend and, in this case, the controller may control the ascending/descending unit to move the cleaner body upward when the cleaner body is docked on the charging stand. The controller may control the ascending/descending unit that has ascended to descend, to move the cleaner body downward, and to connect the charging terminal to the charging stand. The cleaner may further include a cleaning nozzle coupled to the cleaner body and including a suction port formed in a bottom surface thereof to suck foreign substances from an area to be cleaned.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cleaner comprising:
   a body;
   a power supply received in the body and including:
      a first battery and a second battery; and
      a power supply circuit that selectively operates in a charge mode associated with receiving external power to recharge the first battery and the second battery or in a discharge mode associated with supplying stored power from the first battery and the second battery to a load;
   a charging terminal connected to the power supply and that connects to a charging stand when the body docks into the charging stand to receive the external power; and
   a controller configured to manage the power supply,
   wherein the power supply circuit includes:
      a main switch that closes to connect the first battery and the second battery in series to each other in the discharge mode and opens to cause the first battery and the second battery to be connected in parallel to each other in the charge mode;
      a first switch that is closed in the charge mode to supply the external power to the first battery; and
      a second switch that is closed in the charge mode to supply the external power to the second battery,
      the main switch being mechanically pressed to be opened when the charging terminal is connected to the charging stand.

2. The cleaner of claim 1, wherein the controller further manages the main switch to open when the charging terminal is connected to the charging stand.

3. The cleaner of claim 1, wherein the first battery and the second battery are connected in parallel to a direct current (DC) power of the charging stand in the charge mode.

4. The cleaner of claim 1, wherein each of the first switch and the second switch includes one or more diodes to prevent inverse current.

5. The cleaner of claim 1, wherein the main switch includes one end connected to a negative electrode terminal of the first battery and another end connected to a positive electrode terminal of the second battery.

6. The cleaner of claim 1, wherein each of the first switch and the second switch includes a first N channel MOSFET with a drain terminal connected to the first battery or the second battery, a second N channel MOSFET with a source terminal connected to a source terminal of the first N channel MOSFET and a drain terminal connected to the charging terminal, and a bipolar junction transistor (BJT) connected to gate terminals of the first N channel MOSFET and the second N channel MOSFET.

7. The cleaner of claim 6, wherein
   the BJT includes a collector terminal connected to the gate terminals of the first N channel MOSFET and the second N channel MOSFET and a base terminal connected to the controller, and
   the BJT is turned on according to control of the controller.

8. The cleaner of claim 6, wherein
   each of the first switch and the second switch further includes a diode provided between the drain terminal and the source terminal of the first N channel MOSFET, and
   the diode is configured to prevent inverse current flowing toward the charging terminal in the discharge mode.

9. The cleaner of claim 6, wherein each of the first switch and the second switch further includes a diode provided between the drain terminal and the source terminal of the second N channel MOSFET, and
   the diode is configured to prevent inverse current flowing toward the drain terminal and the source terminal of the first N channel MOSFET in the charge mode.

10. The cleaner of claim 6, wherein the power supply circuit further includes shunt resistors connected to the first battery and the second battery.

11. The cleaner of claim 6, wherein each of the first switch and the second switch includes a resistor provided between the gate terminal and the drain terminal of the second N channel MOSFET.

12. The cleaner of claim 1, wherein the power supply circuit further includes:
   a first current detector that detects current to the first battery, and
   a second current detector that detects current to the second battery.

13. The cleaner of claim 1, further comprising:
   one or more wheels to move the body along a surface; and
   a height adjustor coupled to the body to raise or lower the body relative to the surface.

14. The cleaner of claim 13, wherein the controller controls the height adjustor to raise the body upward when the cleaner is docking on a charging stand that provides the external power.

15. The cleaner of claim 14, further comprising a charging terminal connected to the power supply, wherein the controller further controls the height adjustor, after raising the cleaner during docking, to lower the cleaner when docking is completed to connect the charging terminal to the charging stand.

16. The cleaner of claim 15, wherein the charging terminal is provided on a bottom surface of the body.

17. The cleaner of claim 1, further comprising:
   a motor to provide a force to drive the one or more wheels based on the stored power from the first battery and the second battery.

18. The cleaner of claim 1, further comprising a cleaning nozzle coupled to the body, the cleaning nozzle including a bottom surface having a port to receive foreign substances from an area to be cleaned based on a suction force generated by the cleaner based on the stored power from the first battery and the second battery.

19. A cleaner comprising:
   a body;
   a power supply received in the body and including:
      a first battery and a second battery; and
      a power supply circuit that selectively operates in a charge mode associated with receiving external power to recharge the first battery and the second battery or in a discharge mode associated with supplying stored power from the first battery and the second battery to a load; and
   a controller configured to manage the power supply,
   wherein the power supply circuit includes:
      a main switch that closes to connect the first battery and the second battery in series to each other in the discharge mode and opens to cause the first battery and the second battery to be connected in parallel to each other in the charge mode;
a first switch that is closed in the charge mode to supply the external power to the first battery; and
a second switch that is closed in the charge mode to supply the external power to the second battery, and
wherein each of the first switch and the second switch includes a first N channel metal-oxide-semiconductor field-effect transistor (MOSFET) with a drain terminal connected to the first battery or the second battery, a second N channel MOSFET with a source terminal connected to a source terminal of the first N channel MOSFET and a drain terminal connected to the charging terminal, and a bipolar junction transistor (BJT) connected to gate terminals of the first N channel MOSFET and the second N channel MOSFET.

20. A cleaner comprising:
a body;
a power supply received in the body and including:
  a first battery and a second battery; and
  a power supply circuit that selectively operates in a charge mode associated with receiving external power to recharge the first battery and the second battery or in a discharge mode associated with supplying stored power from the first battery and the second battery to a load, the power supply circuit including:
    a main switch that closes to connect the first battery and the second battery in series to each other in the discharge mode and opens to cause the first battery and the second battery to be connected in parallel to each other in the charge mode;
    a first switch that is closed in the charge mode to supply the external power to the first battery; and
    a second switch that is closed in the charge mode to supply the external power to the second battery;
one or more wheels to move the body along a surface;
a height adjustor coupled to the body to raise or lower the body relative to the surface; and
a controller configured to manage the power supply, and control the height adjustor to raise the body upward when the cleaner is docking on a charging stand that provides the external power.

* * * * *